United States Patent [19]

Hattori et al.

[11] Patent Number: 5,719,619
[45] Date of Patent: Feb. 17, 1998

[54] BIDIRECTIONAL BROADCASTING METHOD, BIDIRECTIONAL BROADCASTING SYSTEM AND RECEIVER APPARATUS FOR BIDIRECTIONAL BROADCAST

[75] Inventors: Yoshitsugu Hattori, Tokyo; Hitoshi Yoshinobu, Kanagawa; Kunio Nagai, Tokyo, all of Japan

[73] Assignee: Sony Corporation, Tokyo, Japan

[21] Appl. No.: 536,379

[22] Filed: Sep. 29, 1995

[30] Foreign Application Priority Data

Oct. 8, 1994 [JP] Japan ................... 6-270446

[51] Int. Cl.⁶ ..................... H04N 7/00; H04N 7/10; H04N 7/14
[52] U.S. Cl. ..................... 348/13; 348/13; 348/1; 434/323; 455/2; 455/5.1
[58] Field of Search ................... 348/1, 2, 7, 10, 348/12, 13; 455/2, 4.2, 5.1, 6.1, 6.2, 6.3; 434/322, 323; H04N 7/00, 7/10, 7/14, 7/16, 7/173

[56] References Cited

U.S. PATENT DOCUMENTS

| | | | |
|---|---|---|---|
| 4,151,370 | 4/1979 | Root | 455/21 |
| 4,584,602 | 4/1986 | Nakagawa | 348/1 |
| 4,592,546 | 6/1986 | Fascenda et al. | 463/29 |
| 4,926,255 | 5/1990 | Von Kohorn | 348/13 |
| 5,120,076 | 6/1992 | Luxenberg et al. | 455/21 |
| 5,226,177 | 7/1993 | Nickerson | 348/13 |
| 5,363,433 | 11/1994 | Isono | 348/1 |

FOREIGN PATENT DOCUMENTS 6233205   8/1994   Japan ................... H04N 5/44

*Primary Examiner*—John K. Peng
*Assistant Examiner*—Linus H. Lo
*Attorney, Agent, or Firm*—Jay H. Maioli

[57] ABSTRACT

A bidirectional broadcasting method and system allows, even when an existing telephone voting service is used to respond to a bidirectional broadcast, broadcasting wherein a plurality of questions are related to each other. A broadcasting station broadcasts questions, answer choices for a response to each question and responding destination telephone numbers for the individual answer choices, and successively broadcasts evaluation information for allowing receiver apparatus to perform evaluation of histories of responses to the questions and determine whether or not the responding persons of the individual receiver apparatus are response allowed persons. Each receiver apparatus stores the history of responses to the questions into a memory and, based on the evaluation data from the broadcasting station, evaluates the history of responses to the questions. Then, based on the selection data from the broadcasting station and a result of the evaluation, it determines whether or not a given person is allowed to respond to a later question. When it is determined that such person is not a response-allowed person, the receiver apparatus prevents origination of a call for a later response therefrom.

18 Claims, 25 Drawing Sheets

SPECIFICATIONS OF DTMF SIGNAL IN TELEPHONE LINE

| ITEM | ALLOWABLE RANGE |
|---|---|
| SIGNAL SENDING OUT TIME | 50 msec OR MORE |
| MINIMUM PAUSE (MINIMUM VALUE OF REST TIME BETWEEN ADJACENT SIGNALS) | 30 msec OR MORE |
| PERIOD (SIGNAL SENDING TIME + MINIMUM PAUSE) | 120 msec OR MORE |

FIG. 10

| PACKET IDENTIFICATION CODE | SELECTION TYPE CODE | SELECTION DATA SEL (DIFFERENT IN LENGTH DEPENDING UPON TYPE) | | | | CHECK DATA | PACKET END CODE |
|---|---|---|---|---|---|---|---|

Selection Data SEL expanded:

| | MINIMUM CORRECT ANSWER REQUIRING QUANTITY (00~99 or **) | | | |
|---|---|---|---|---|

| BB | 0 | | | | | |
|---|---|---|---|---|---|---|
| BB | 1 | 0~9 | 0~9 | …… | 0~9 | * |
| BB | 2 | 00~99 | 00~99 | …… | 00~99 | * |

Row 1 (type 1): CORRECT ANSWER REQUIRING QUESTION NUMBER

Row 2 (type 2): CORRECT ANSWER REQUIRING QUESTION NUMBER

FIG. 11A

| 01 | 01800000001 | * | 02 | 1 | * | 03 | 1 | * | 04 | 1 | * |

ANSWER CHOICE DATA | ANSWER CHOICE DATA | ANSWER CHOICE DATA | ANSWER CHOICE DATA

FIG. 11B

| 01 | 01800000001 | * | 02 | 1 | * | 03 | 2 | * | 04 | 3 | * |

ANSWER CHOICE DATA | ANSWER CHOICE DATA | ANSWER CHOICE DATA | ANSWER CHOICE DATA

FIG. 11C

| 01 | 101 | * | 02 | 102 | * | 03 | 103 | * | 04 | 104 | * |

ANSWER CHOICE DATA | ANSWER CHOICE DATA | ANSWER CHOICE DATA | ANSWER CHOICE DATA

BIDIRECTIONAL BROADCASTING METHOD, BIDIRECTIONAL BROADCASTING SYSTEM AND RECEIVER APPARATUS FOR BIDIRECTIONAL BROADCAST

FIELD OF THE INVENTION

This invention relates to a bidirectional broadcasting method, a bidirectional broadcasting system and a receiver apparatus for a bidirectional broadcast.

BACKGROUND OF THE INVENTION

A bidirectional broadcast is conventionally popular wherein, for example, in television shopping, a questionnaire investigation, a quiz program of the audience participation type or a like program of a television broadcast, a telephone number for acceptance of a response from a television broadcasting station is displayed in a superimposed condition on a screen for a suitable period of time whereas responses from the television viewers are sent by way of telephones or facsimile apparatus.

However, the conventional bidirectional broadcasting method or system is disadvantageous in that, when television viewers originate telephone calls to a telephone number for acceptance of a response in order to respond to such a bidirectional broadcasting program as described above, telephone lines are so crowded that the telephone calls are not connected readily or much time is required for responses by word of mouth, and burdens of charges for use of lines on the television viewers are increased or an excessive load is applied to the telephone lines.

In order to eliminate the disadvantages of telephone lines upon responding to a bidirectional broadcast, a telephone voting service has come to be provided by a telephone office.

The telephone voting service is a system wherein, for example, in a questionnaire investigation or a quiz or the like of a program of a television or radio broadcast, a publication or the like, telephone numbers for acceptance of responses are assigned individually to a plurality of answer choices to one question, and numbers of terminating calls to the individual telephone numbers, that is, numbers of responses from the television viewers, are counted and totalled by individual calling side center offices and notified to the broadcasting station side or the publication source side. The system makes use of an existing telephone infrastructure.

A detailed example of the telephone voting service will be described. When, for example, broadcasting of a questionnaire investigation of favorite baseball teams is performed, for example, in a television program, telephone numbers for acceptance of responses different for individual baseball teams which make answer choices for a response are set and broadcast as shown on a television screen 1 of FIG. 26.

Each of the television viewers 2 will refer to the television screen 1 and dial the telephone number corresponding to its favorite baseball team.

Then, a telephone voting service system 3 receives terminating calls of the individual telephone numbers for acceptance of responses at digital exchanges of subscriber central exchange offices in individual districts of the television viewers, sends automatic audio responding messages for notification of completion of reception to the responding persons and performs primary totalling of numbers of terminating calls to the individual telephone numbers for acceptance of responses. Then, the telephone voting service system 3 collects data of the numbers of terminating calls primarily totalled by the subscriber central exchange offices in the districts of the country at a service network control station, and totals the thus collected data at a management office. The management office notifies the thus totalled numbers of terminating calls to the individual telephone numbers for acceptance of responses to a call notifying computer 4a of a television broadcasting station 4 by way of a call number notifying line 3a.

The television broadcasting station 4 thus broadcasts such a screen of a graph of a result of the totalling as shown on a television screen 5 of FIG. 26 in order to reflect the result of the totalling notified from the telephone voting service system 3 on the broadcasting program.

It is to be noted that, in the telephone voting service, in response to a request from a service contractor (in the present example, the television broadcasting station 4), in the example of FIG. 26, in response to a request from a customer controlling computer 4b, an originating call from an arbitrary responding person can be terminated directly to the service contractor (in the present example, an operator 4c of the broadcasting station). This service is called cut-through. A connection notification is sent from the telephone voting service system 3 to a responding person which is to receive a cut-through service, and in the cut-through condition, direct talking or direct communications of data between the responding person and the service contractor can be performed by way of a line 3c for cut-through acceptance. However, the number of lines for cut-through acceptance is limited in advance.

In the telephone voting service described above, a response of any responding person is substantially completed at the point of time of termination of the telephone call to a central office, and the line can be disconnected immediately. Consequently, the load to the telephone line is moderated, and required charges can be made equal from whichever locations in the country telephone calls are originated. Further, on the television viewer side, since an originating call can be disconnected immediately after it is terminated, the burden of the charge for use of a line is moderated.

Further, since telephone calls are terminated at subscriber central exchange offices and totalling of telephone votes is distributed to individual districts, overcrowding of interexchange channels can be prevented, and comparatively large numbers of originating calls within a short time can be notified as vote numbers to the broadcasting station side.

However, in the system for the telephone voting service at present, only numbers of votes for different answer choices for each single questionnaire are notified to a service contractor side such as the broadcasting station in the example described above, and the service contractor cannot obtain mutually related responses (votes) to a plurality of questions. For example, even if it is desired to have the television viewers respond to a series of quizzes in a winner-success (loser-failure) fashion or to have, for example, only men of ages higher than a particular age respond based on a questionnaire by the telephone voting service performed earlier, it is impossible to eliminate responding accesses from unqualified persons or even it is impossible to investigate whether or not responding persons are qualified.

Also it is possible to perform processing of acceptance or selection of results of votes of mutually related responses to a plurality of questions described above by strengthening the processing functions of subscriber central exchange offices of the central office side. However, when originating calls are concentrated within a short period of time, an excessive load is applied to exchanges, which is difficult to be processed by the conventional subscriber central exchange offices. Therefore, it is necessary to improve the subscriber central exchange offices. However, it is not practical from the point of view of the cost to improve a large number of subscriber central exchange offices in the entire country, which exceeds, for example, 7,000 in Japan, only for the object of strengthening of the functions of the telephone voting service.

Further, as one of forms of a bidirectional program of television or radio broadcasting, there is a broadcasting program of the premium type in which some prize money or prize article is offered to a responding person. In a program of the type just described, a responding person must be specified. With the conventional telephone voting service system, however, since any telephone call is terminated to a subscriber central exchange office and only totalled at the point of time as a mere single vote, the responding person cannot be specified by the broadcasting station side.

Indeed, also with the conventional telephone voting service system described above, it is possible for the broadcasting station to specify a responding person using the cut-through service. However, since whether or not the cut-through service should be used does not depend upon a choice which reflects a result of a vote, it is impossible to use the cut-through service only for responding persons who have voted to a particular answer choice. Therefore, it is substantially impossible to broadcast such a broadcasting program of the premium type as described above in a form which makes use of the telephone voting service.

On the other hand, a responding person can be specified if responses to a broadcasting program of the premium type are collected by way of channels formed from terminals of all responding persons to a terminal or terminals of the broadcasting station side. In this instance, however, it matters whether or not accesses from all responding persons can be processed avoiding overcrowding of telephone lines as described above.

SUMMARY OF THE INVENTION

It is an object of the present invention to provide a bidirectional broadcasting method, a bidirectional broadcasting system and a receiver apparatus for a bidirectional broadcast wherein, even when responding to a bidirectional broadcast is performed using an existing telephone voting service, broadcasting wherein a plurality of questions are related to each other can be performed and reduction of the number of responding persons can be performed.

It is another object of the present invention to provide a bidirectional broadcasting method, a bidirectional broadcasting system and a receiver apparatus for a bidirectional broadcast wherein specification of a responding person or persons to respond to a bidirectional broadcast can be performed with certainty from a broadcasting station side.

In order to attain the objects described above, according to an aspect of the present invention, there is provided a bidirectional broadcasting method wherein a question, a plurality of answer choices for a response to the question and responding destination telephone numbers for the individual answer choices are broadcast and terminating call number information of responses to the individual answer choices from responding persons is obtained, wherein evaluation information for allowing receiver apparatus to perform evaluation of histories of responding operations to more than one question and selection information for allowing the receiver apparatus to perform, based on results of the evaluation by the receiver apparatus based on the evaluation information, selection of whether or not the responding persons of the individual receiver apparatus are response allowed persons are broadcast, and the broadcasting of a question, the broadcasting of evaluation information and the broadcasting of selection information are performed repetitively more than one time to successively reduce the number of the response allowed persons.

According to another aspect of the present invention, there is provided a bidirectional broadcasting system which includes a broadcasting station which provides a bidirectional program, and a plurality of receiver apparatus which respond to the bidirectional program by way of telephone lines, comprising means provided in the broadcasting station for broadcasting more than one question, answer choices for responses to the individual questions and responding destination telephone numbers for the individual answer choices and broadcasting, after results of responses to the questions are received, evaluation information for allowing the receiver apparatus to evaluate histories of responding operations to the questions and selection information for allowing the receiver apparatus to perform, based on results of evaluation of the receiver apparatus based on the evaluation information, selection of whether or not responding persons of the receiver apparatus are response allowed persons, means provided on each of the receiver apparatus for storing, when a responding operation is performed corresponding to a selected one of the answer choices to each of the questions, a history of the responding operation into storage means, means provided on each of the receiver apparatus for evaluating the history of responding operations stored in the storage means based on the evaluation data received from the forecasting station, means provided on each of the receiver apparatus for discriminating, based on the selection data from the broadcasting station and a result of the evaluation, whether or not the responding person of the receiver apparatus can be a response allowed person to a next question, and means provided on each of the receiver apparatus for restricting origination of a call for a response from the receiver apparatus when it is discriminated as a result of the discrimination that the responding person of the receiver apparatus cannot be a response allowed person to a next question.

According to a further aspect of the present invention, there is provided a receiver apparatus for a bidirectional broadcast, comprising a broadcasting program providing section for receiving a broadcasting signal and providing a bidirectional broadcast program to a user of the receiver apparatus, a decoding section for extracting and decoding bidirectional program information multiplexed with the broadcasting signal, a communication interface for responding to the bidirectional program by way of a telephone line, a key inputting operation section manually operable by the user to perform a responding operation to the bidirectional program, a response execution section for performing a response in response to the responding operation, means for storing a history of the responding operation into storage means, evaluation means for discriminating a multiplexed signal obtained from the decoding section and comparing, when the multiplexed signal is evaluation data, the history of responding operations stored in the storage means with the evaluation data to perform evaluation of the response, and discrimination means for discriminating the multiplexed signal obtained from the decoding section, discriminating, when the multiplexed signal is selection data, based on a result of the evaluation by the evaluation means and the selection data, whether or not the receiver apparatus is selected, and controlling when the receiver apparatus is not selected, the response execution section so that a response byway of the telephone line is restricted irrespective of a later responding operation of the user.

In the bidirectional broadcasting method, the bidirectional broadcasting system and the receiver apparatus for a bidirectional broadcast of the present invention, the receiver apparatus stores, when it responds to a broadcast of a question provided by the broadcasting station, the history of the response into the storage means. Then, when evaluation data for the question are broadcast from the broadcasting station, the receiver apparatus performs, based on the evaluation data, evaluation of the response performed by itself. Further, when selection data are broadcast from the broadcasting station, the receiver apparatus performs, based on the selection data, selection of whether or not the receiver apparatus can be, based on a result of the evaluation of the response, a response allowed person to a later question. Then, when it is discriminated that the receiver apparatus cannot be a response allowed person to a later question, the receiver apparatus by itself restricts origination of a call for a later response so as to inhibit such origination.

As a result, the number of responding persons to a next question is automatically reduced. In other words, even where a telephone voting service is utilized for responses to a bidirectional program, a plurality of questions can be broadcast in such a manner that a response to a following one of the questions is related to the response to a preceding one of the questions.

Since the number of responding persons can be reduced in such a manner as described above even where a telephone voting service is utilized for responses to a bidirectional broadcast, it is possible to perform broadcasting of a bidirectional program of the premium type wherein some prize article or some prize money is offered to responding persons when the number of responding persons is smaller than a fixed number.

Thus, with the bidirectional broadcasting method, the bidirectional broadcasting system and the receiver apparatus for a bidirectional broadcast of the present invention, since the broadcasting station broadcasts question data, evaluation data and selection data whereas the receiver apparatus on the responding side performs evaluation of responses till then and discriminates whether or not the receiver apparatus is selected by the broadcasting station so that it can respond to a later question, and then restricts, when the receiver apparatus is not selected, origination of a call for a response on the responding side. As a result, even when a response is performed using a telephone voting service, a program in which responses related to a plurality of questions are anticipated can be broadcast.

Further, reduction of the number of response allowed persons can be performed readily, and it can be discriminated readily that the number of responding persons has been reduced to such a degree that an overcrowding condition can be prevented within a range of a number of telephone lines prepared in advance. Accordingly, after the number of responding persons is reduced to such a degree as described above, identification information for specifying the responding persons can be obtained readily by way of telephone lines by the broadcasting station side.

Since restriction of origination of a call for a response is performed on the call origination side for a response, wasteful origination of a call to a telephone network can be prevented.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 10 is a diagrammatic view showing an example of a data structure of (selection+ID request) data;

FIGS. 11A to 11C are diagrammatic views illustrating different methods for compression and transmission of telephone number information for acceptance of responses;

DESCRIPTION OF THE PREFERRED EMBODIMENTS

Figure 1:
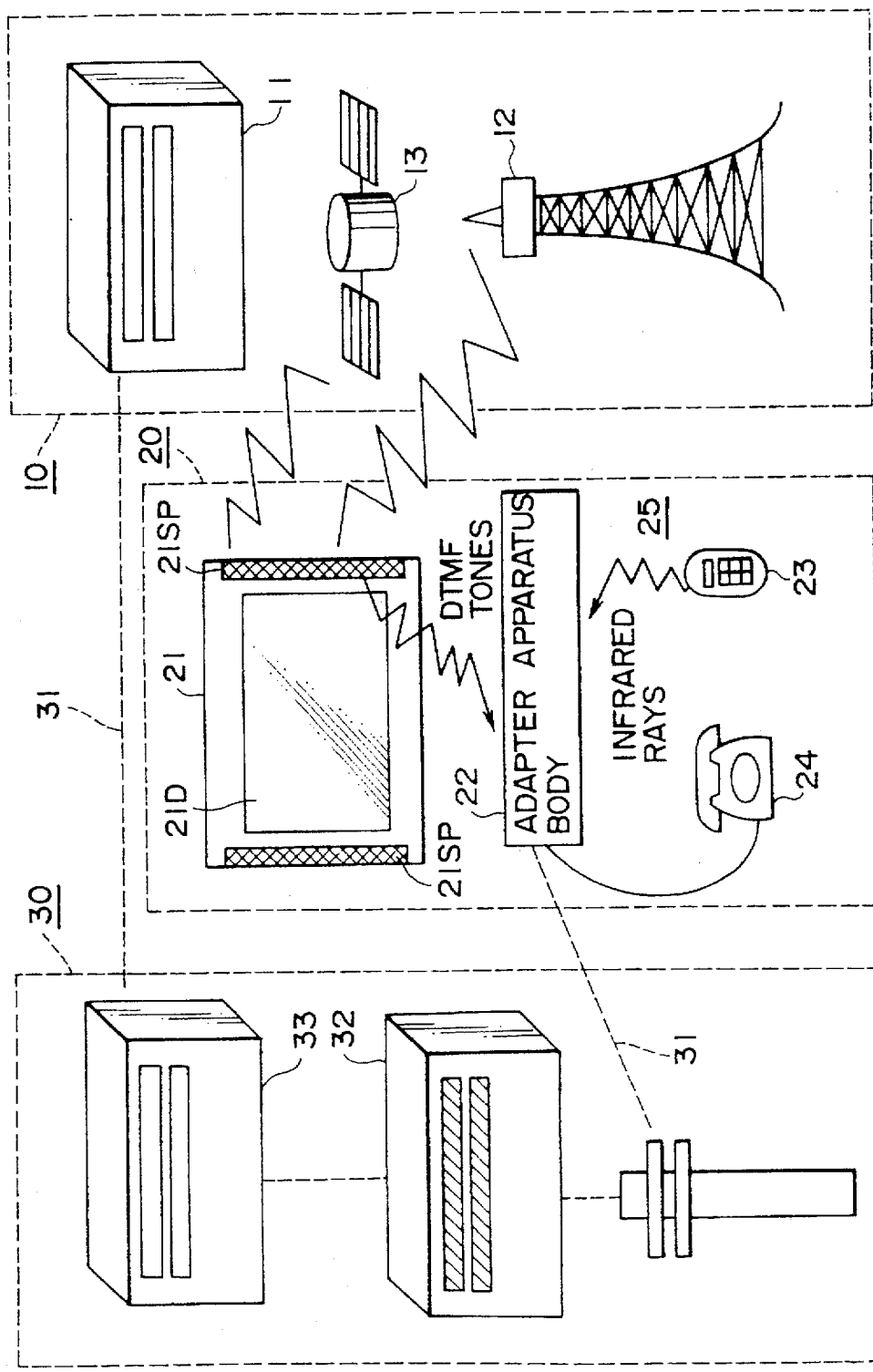
FIG. 1 is a diagrammatic view showing an outline of an entire bidirectional broadcasting system to which the present invention is applied.

A preferred embodiment of a bidirectional broadcasting method and a receiver apparatus for a bidirectional broadcast according to the present invention will be described below. The present embodiment is applied to a television broadcast, and in the present embodiment, a broadcasting station broadcasts questions and answer choices to the questions as a broadcasting program. Further, the broadcasting station broadcasts program related information as sub broadcasting information such as question data including question numbers, answer choice numbers, responding destination telephone numbers and so forth, evaluation data for evaluation of the questions and selection data for selection of responding persons from results of the evaluation in a multiplexed condition with the broadcasting signal.

Here, in the present embodiment, the program related information is broadcast as a signal construction of a DTMF signal form in a multiplexed (mixed) condition with a main broadcasting audio signal. Meanwhile, on the receiver side, the DTMF signal is demultiplexed from the received broadcasting audio signal and decoded to reproduce the program related information. The program related information is stored into a memory so that it is utilized for a later response to the bidirectional program.

Further, in the present embodiment, the telephone voting service described hereinabove is utilized for the response to the bidirectional program.

[DTMF signal]

First, the DTMF signal will be described with reference to FIG. 2.

The DTMF signal method is an audio band signal method wherein two tones including a tone of a group of low frequencies (low group) and another tone of another group of high frequencies (high group) are sent simultaneously. Each of the low and high frequency groups includes tones of four audio band frequencies any two of which do not have an articulation relationship to each other.

In the DTMF signal method, the four frequencies of the low group are, for example, 697 Hz, 770 Hz, 852 Hz and 941 Hz, and the four frequencies of the high group are, for example, 1,209 Hz, 1,336 Hz, 1,477 Hz and 1,633 Hz. And, one of the four frequencies of the low group and one of the four frequencies of the high group are combined with each other to produce a DTMF signal, and different DTMF signals (each of the DTMF signals will be hereinafter referred to as function signal) formed from different combinations of frequencies are assigned to push buttons "0" to "D" arranged in four rows and four columns as seen in FIG. 2.

In telephone communications, from among function signals of 16 combinations of the DTMF signal, merely 12 function signals are generally used for a signal of a subscriber address (telephone number). In particular, the 12 function signals of the combinations described above correspond to the digits "0" to "9" which are employed as ten keys by a telephone set and the symbols "*" and "#". The function signals corresponding to the characters of "A", "B", "C" and "D" indicated by broken lines in FIG. 2 are not generally utilized in Japan, but are utilized only for data transmission which makes use of a push-button (PB) dial.

Figures 2, 3:
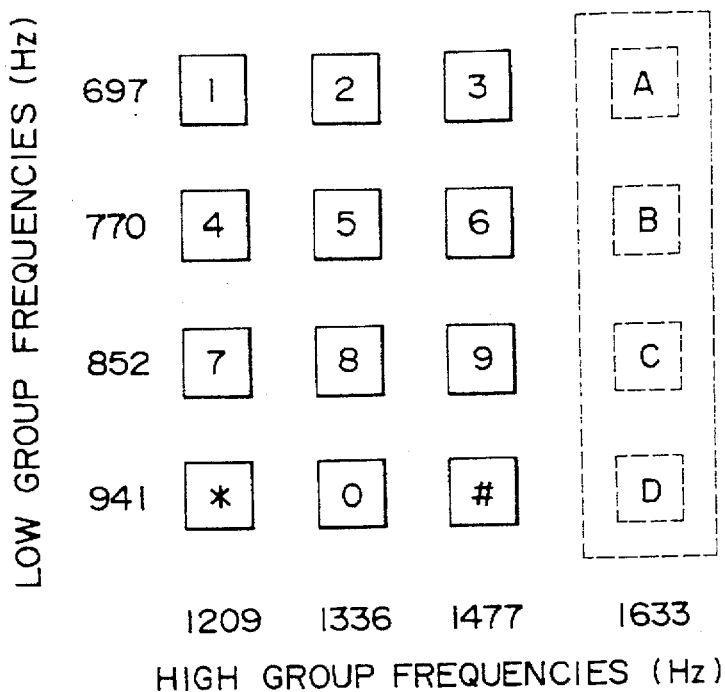
FIGS. 2 and 3 are a diagrammatic view and a table, respectively, illustrating a DTMF signal.

When selection of a line based on a telephone number is to be performed using such DTMF signal, signal sending out requirements are prescribed as illustrated in FIG. 3.

Due to such a combination of two frequencies and sending out requirements as described above, a DTMF signal is produced seldom in the natural world and can be discriminated definitely from natural sound such as a voice of a man. Therefore, the DTMF signal can be broadcast in a multiplexed (mixed) condition with an ordinary broadcasting audio signal, and can be demultiplexed comparatively readily on the receiver side.

Incidentally, a DTMF signal is utilized also by a multi-function telephone. In particular, by using a DTMF signal, it is possible, in response to an operation of buttons of a telephone set of the push-button type at a location outside, to reproduce a message recorded in a telephone answering machine or to record or reproduce/erase a responding message in or from the telephone answering machine.

[Outline of Bidirectional Broadcasting System]

Referring now to FIG. 1, there is shown an outline of a bidirectional broadcasting system according to the preferred embodiment of the present invention. The bidirectional broadcasting system shown includes a system 10 of a broadcasting station, a receiver apparatus system 20, and a system 30 of a central office including a telephone voting service system 33.

The system 10 of the broadcasting station includes a studio 11 in which a bidirectional program is produced. The bidirectional program is transmitted to the receiver apparatus system 20 by a ground wave from a broadcasting antenna 12 or by way of an artificial satellite 13. Upon broadcasting of a bidirectional program, for example, a quiz program or a questionnaire investigation program, questions and a plurality of answer choices to each of the questions are broadcast on a screen of a television receiver or by way of announcement by a chairman of the program. The questions are normally broadcast by more than one. In this instance, bidirectional program related information is multiplexed in the form of a DTMF signal, whose format is determined in such a manner as will be hereinafter described, with a broadcasting audio signal.

The receiver apparatus system 20 includes an existing television receiver 21, and an adapter apparatus 25 for reception of bidirectional program related information and for responding operation. The adapter apparatus 25 includes an adapter apparatus body 22 and a remote commander 23 which makes use of infrared rays. A telephone set 24 for external connection can be connected to the adapter apparatus body 22.

Figure 4:
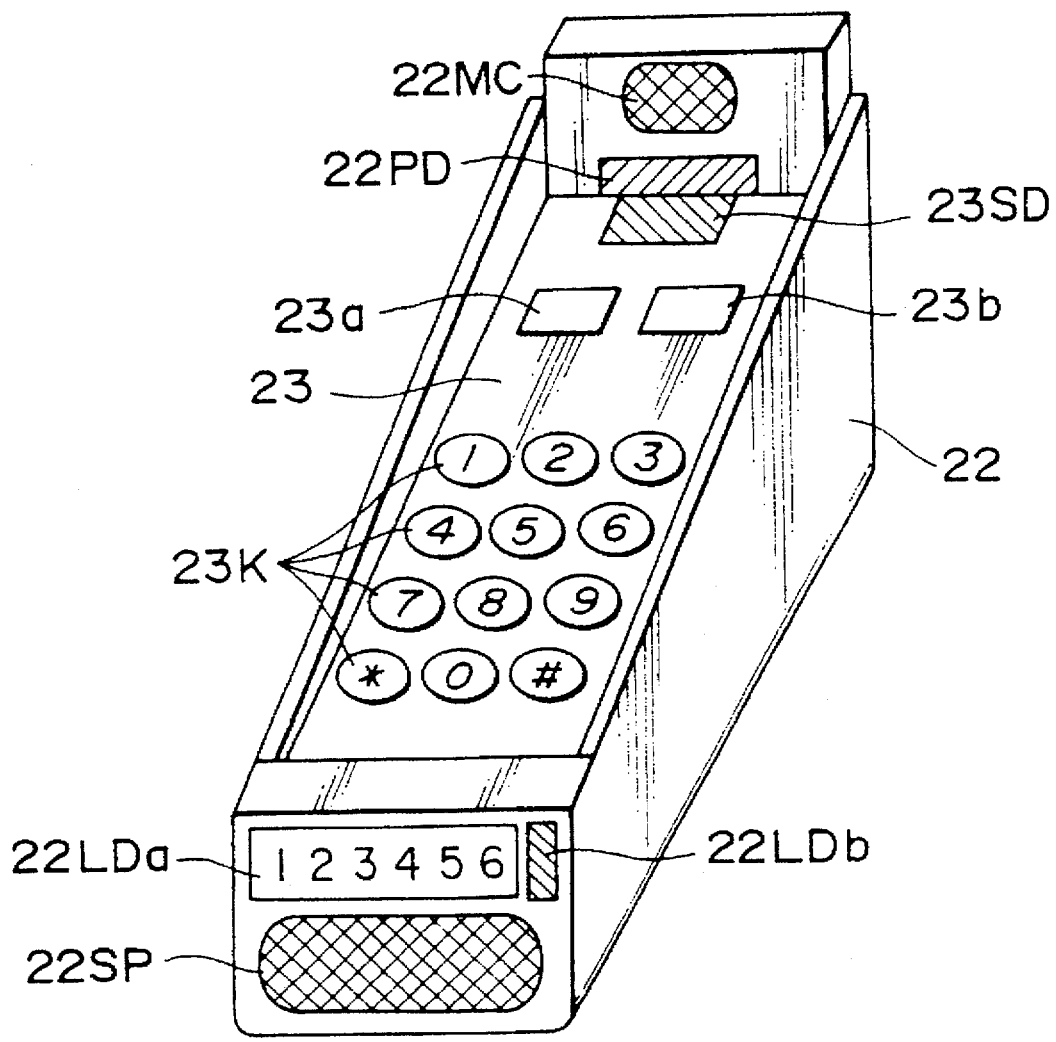
FIG. 4 is a schematic perspective view showing an example of an adapter apparatus of a receiver apparatus employed in the bidirectional broadcasting system of FIG. 1.
Figure 5:
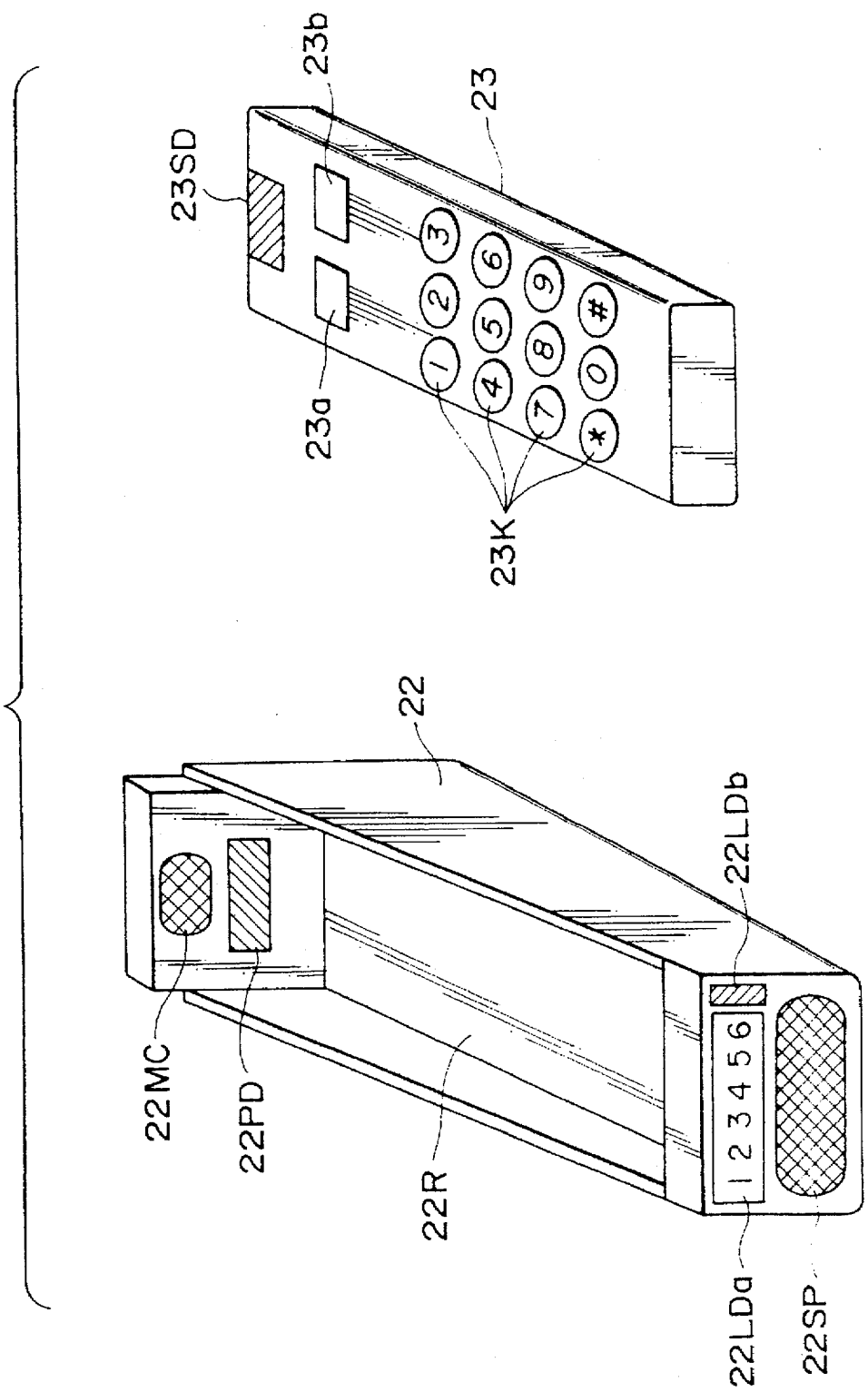
FIG. 5 is an exploded perspective view of the adapter apparatus of FIG. 5.

The adapter apparatus body 22 includes a reception section and a decoding section for an infrared ray remote control signal of the remote commander 23. The remote commander 23 can be accommodated in the adapter apparatus body 22 in such a condition that an infrared ray emitting element 23SD of the remote commander 23 is opposed to an infrared ray receiving element 22PD of the adapter apparatus body 22 as seen in FIG. 4. In particular, as shown in FIG. 5, the adapter apparatus body 22 has a recess 22R for receiving the remote commander 23 therein. When the remote commander 23 is accommodated in the recess 22R, the adapter apparatus body 22 has such an appearance as seen in FIG. 4.

When the remote commander 23 is accommodated in the adaptor apparatus body 22 as shown in FIG. 4, various buttons 23a, 23b and 23K thereof can be manually operated. If any one of the buttons 23a, 23b and 23K is manually operated, then a remote control signal corresponding to the thus operated button is sent by way of the infrared ray emitting element 23SD and the infrared ray receiving element 22PD to and decoded by the adapter apparatus body 22. Consequently, when the adapter apparatus body 22 and the remote commander 23 are used, they operate like a single adapter for reception of bidirectional program information and for responding operation.

The adapter apparatus body 22 includes, as hereinafter described in more detail, an NCU (network control unit) serving as an interface with a telephone line. A telephone line 31 and the telephone set 24 for external connection are connected to the adapter apparatus body 22 as shown in FIG.

1. In the embodiment shown, the telephone set 24 for external connection can access the telephone line 31 by way of the adapter apparatus body 22 and can exhibit an ordinary telephone function.

Further, as hereinafter described, the adapter apparatus body 22 and the remote commander 23 cooperate with each other so that they have a function of a hand-free telephone set. In particular, referring to FIGS. 4 and 5, the remote commander 23 includes the on-hook button 23a and the off-hook button 23b as well as the ten-key (numeric and so forth) buttons 23K. Meanwhile, the adapter apparatus body 22 includes a microphone 22MC and a loudspeaker 22SP.

When a telephone call is to be originated from the adapter apparatus 25 as a hand-free telephone set, the off-hook button 23b will first be depressed, and then a telephone number will be dialed using the ten-key buttons 23K. On the other hand, when a terminating call from the other party is received, only the off-hook button 23b will be depressed. Upon talking to the other party, voice to be transmitted from the adapter apparatus 25 is sent by way of the microphone 22MC while received voice from the other party is heard from the loudspeaker 22SP. Then, when the talking to the other party is to be ended, the on-hook button 23a will be depressed to release the telephone line.

The adapter apparatus body 22 serves also as a receiver/decoder for bidirectional program information broadcast as a DTMF signal in a multiplexed condition and further serves as, by cooperating with the remote commander 23, a bidirectional program responding apparatus.

Figure 6:
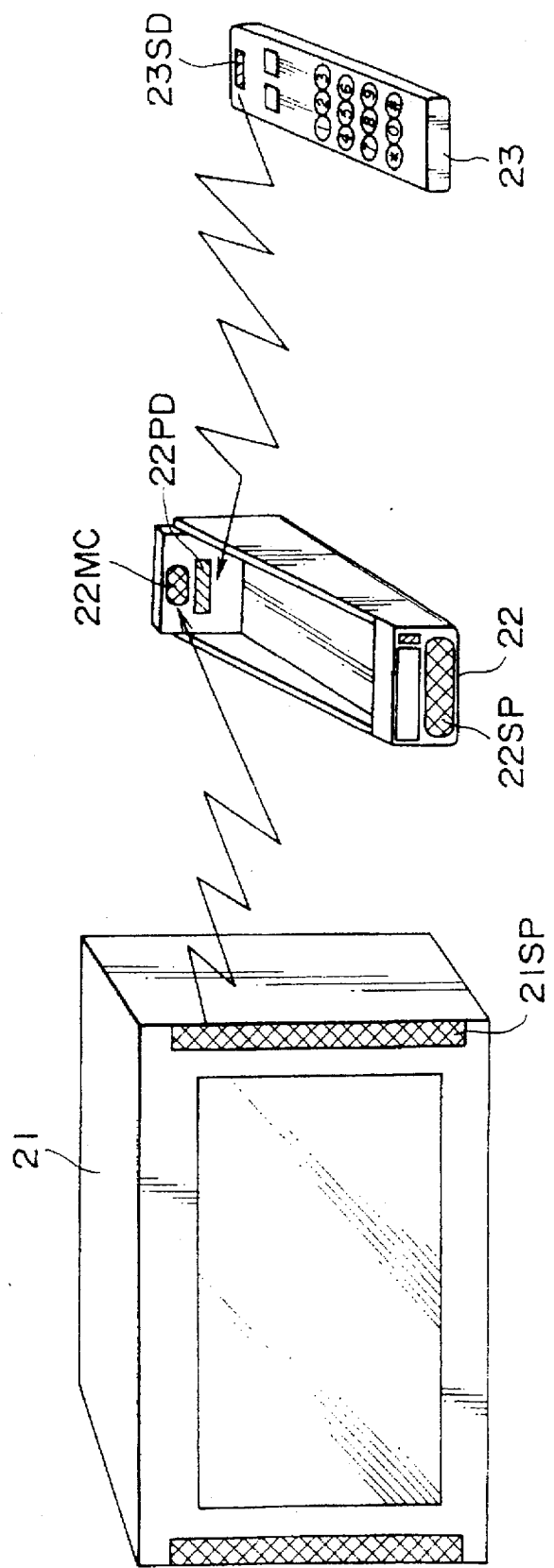
FIG. 6 is a schematic view illustrating a responding operation on the receiver apparatus shown in FIG. 1.

In particular, in the present example, since bidirectional program information is outputted as DTMF tones from a loudspeaker 21SP of the television receiver 21 in a mixed condition with sound of a broadcasting program, the adapter apparatus body 22 collects the output sound of the loudspeaker 21SP of the television receiver 21 by means of the microphone 22MC as seen in FIGS. 1 and 6. The adapter apparatus body 22 has a function of extracting only the DTMF tones from the thus collected sound and decoding the bidirectional program information as hereinafter described. Further, the adapter apparatus body 22 has a function of storing into a built-in memory thereof information necessary for a response from within the thus decoded bidirectional program information. Here, at least responding destination telephone numbers for individual answer choices to a question (telephone numbers of the telephone voting service) are stored into the memory because the telephone voting service is utilized in the present embodiment.

As a responding operation to a question in the present example, one of the ten-key buttons 23K of the remote commander 23 is manually operated to input one of numbers of a plurality of answer choices set and broadcast in advance for the question which is selected by the user (responding person). Further, in the present example, if an answer choice number is selected as an answer to the question in the condition of FIG. 4 or 6 by way of one of the ten-key buttons 23K of the remote commander 23, then the adapter apparatus body 22 receives a remote control signal of the selected answer choice number from the remote commander 23 and stores the number of the question which is an object of the responding operation and the selected answer choice number into a response history memory. Thereafter, the adapter apparatus body 22 reads out a telephone number corresponding to the selected answer choice number from the memory and automatically dials the telephone number.

As shown in FIG. 1, a digital exchange 32 of the central office accepts the telephone call terminating thereto and increments, each time a terminating call to the same telephone number is accepted, the counting number of terminating calls. Then, each such digital exchange 32 notifies to the telephone voting service system 33 numbers of terminating calls to the individual telephone numbers counted thereby. The telephone voting service system 33 is shown as a system which performs data collecting and totalling functions of the service network control offices or the management office described hereinabove.

The numbers of terminating calls corresponding to the individual answer choices totalled by the telephone voting service system 33 in this manner are notified as numbers of responding persons who have selected the answer choices to a computer of the studio of the broadcasting station by way of the telephone lines 31. The broadcasting station broadcasts a result of the totalling to the users in the bidirectional broadcasting program.

Thereafter, from the system 10 of the broadcasting station, evaluation data to the question are broadcast in the form of a DTMF signal in a multiplexed condition with a broadcasting audio signal. The adapter apparatus body 22 receives the evaluation data and compares the question number and the selected answer choice number stored in the response history memory with the evaluation data to evaluate whether or not the selected answer choice is the choice evaluated by the broadcasting station side, that is, if the program is a quiz program, whether or not a correct answer has been responded.

Thereafter, the system 10 of the broadcasting station broadcasts selection data to a result of the evaluation in the form of a DTMF signal in a multiplexed condition with a broadcasting audio signal. The adapter apparatus body 22 thus evaluates the result of evaluation thereof based on the selection data. For example, when the selection data require that the number of correct answers to questions be equal to or greater than a predetermined number, selection is performed based on whether or not the requirement is satisfied. If the requirement is not satisfied and the responding person is not selected, the adapter apparatus body 22 restricts a response so that, for example, a response to a question to be broadcast thereafter may be inhibited. Consequently, even if the user of the adapter apparatus body 22 in the condition thus restricted from a response performs a responding operation to a question broadcast later, no telephone call is originated from the adapter apparatus body 22.

Since the originating side of a response by itself restricts origination of a response, it is possible to provide a quiz program of the winner-success type or a bidirectional broadcasting program of the premium type even in a system wherein a telephone voting service is utilized to respond to a bidirectional program.

[Broadcasting of Bidirectional Program from Broadcasting Station]

As described hereinabove, in the present example, from the television broadcasting station, a question and a plurality of answer choices for a response to the question are broadcast, and contents of the question and contents of the plurality of answer choices to the question are notified to television viewers (responding persons) by way of a screen of a television receiver or by announcement of a chairman of the program. Simultaneously, bidirectional program related information wherein a combination of the digits "0" to "9" and/or the symbols of "#", "*" and "A", "B", "C" and "D" is broadcast in a multiplexed condition with the broadcasting signal.

In the present example, the program related information principally includes question data, evaluation data, selection data and (selection+ID request) data. It is to be noted that the data to be multiplexed further include response control data including a start of acceptance of responses, an end of acceptance of responses, cancellation of restriction to origination of a telephone call or the like.

FIGS. 7, 8, 9 and 10 illustrate examples of data structures of question data, evaluation data, selection data and (selection+ID request) data, respectively. Each of those data has a packet identification code for identification thereof added to the top thereof and has a packet end code added to the last thereof, and the length thereof is variable. In the present example, the packet end code is formed from two successive DTMF signals "DD" each representing the symbol "D".

[1. Question Data]

Figure 7:
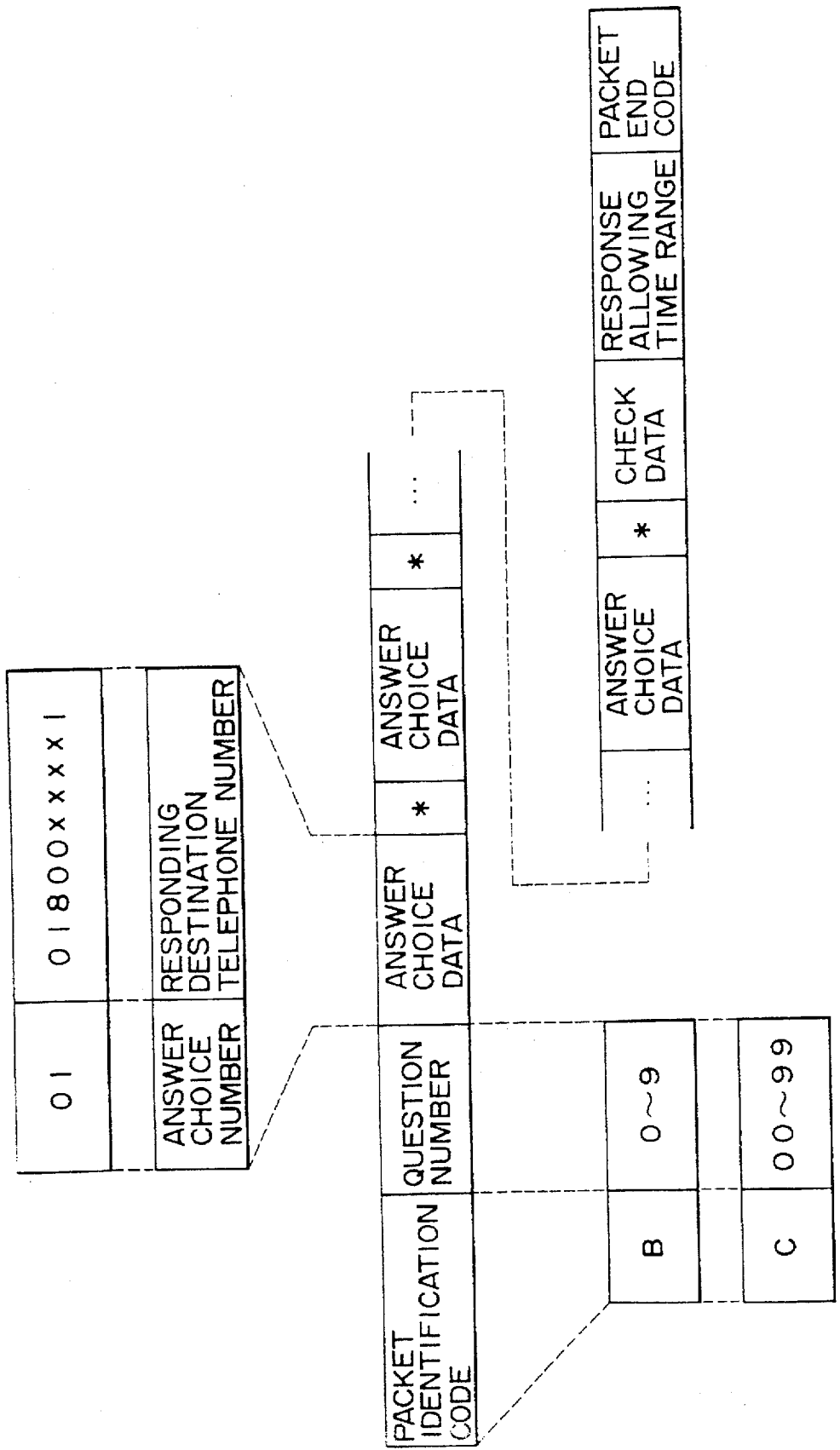
FIG. 7 is a diagrammatic view showing an example of a data structure of question data.

FIG. 7 illustrates an example of the data structure of the question data. Referring to FIG. 7, a packet identification code at the top is followed by a question number. The question number is followed by answer choice data representing the plurality of answer choices broadcast in the broadcasting program corresponding to the question of the question number. The mark "*" serving as a separator (punctuation mark) is interposed between each adjacent ones of the answer choice data.

In the present example, each of the answer choice data include a number (answer choice number) of the answer choice, and a responding destination telephone number (telephone number of the telephone voting service) assigned to the answer choice. In the present example, up to 100 answer choices can be set for one question, and accordingly, the answer choice number is one of "00" to "99". The answer choice numbers may be of course selected as non-serial numbers. Further, the responding destination telephone numbers in the present example are "01800xxxxx".

It is to be noted that, as a responding destination telephone number, all of ten digits thereof need not always be broadcast, and the amount of data to be broadcast in a multiplexed condition can be reduced by the following methods.

According to a first method, all of ten digits of responding destination telephone numbers for the first answer choice data to be broadcast as question data are broadcast. Thereafter, as responding destination telephone numbers for following answer choice data, differences of the responding destination telephone numbers from the responding destination telephone numbers for the first answer choice data or from the responding destination telephone numbers for last answer choice data are broadcast.

For example, in the case of adopting a method wherein, as responding destination telephone numbers for answer choice data for four answer choices of the serial numbers of "01" to "04", differences of them from responding destination telephone numbers for last answer choice data are broadcast, such methods as illustrated in FIGS. 11A to 11C can be employed. In particular, in the example illustrated in FIG. 11A, as a responding destination telephone number for the answer choice of the first answer choice number "01", all digits of "0180000001" are sent, and then as information of responding destination telephone numbers for the answer choices of the following answer choice numbers "02" to "04", only the value "1" is sent as differences of them.

In the example just described, on the receiver apparatus side, the responding destination telephone number for the answer choice of the first answer choice number "01" is determined to be "0180000001", and the responding destination telephone numbers for the answer choices of the following answer choice numbers "02" to "04" are determined to be "0180000002", "0180000003" and "0180000004" by successively adding "1" to the number "0180000001".

It is to be noted that, where the number of answer choices is limited to 10 or less, any answer choice number to be broadcast in a multiplexed condition may be formed from one digit. It is to be noted that, if the difference to be added is determined to be a predetermined fixed value, then information of the difference need not be broadcast in a multiplexed condition.

Meanwhile, the example illustrated in FIG. 11B adopts another method wherein, as responding destination telephone numbers for answer choice data for the four answer choices of the serial numbers "01" to "04", differences from the responding destination telephone numbers for the first answer choice data are broadcast. Also in the present example, if the differences are determined to be predetermined fixed values, they need not be broadcast in a multiplexed condition.

The second method for compressing information of telephone numbers makes use of the facts that telephone numbers for the telephone voting service are decided to have four upper digits of "0180" as described above and besides that, when a broadcasting medium makes use of the telephone voting service, the following next digit is decided to be "0".

In particular, in the present second method, the thus fixed upper five digits are not sent. Then, in the present example, since the number of question data is less than 100, only two variable digits are involved, and three digits higher than the two variable digits are set to an equal digit and represented as a single digit. In particular, where "111" is represented by "1", information of the telephone number "0180011101" can be represented as "101". Meanwhile, where "222" is represented as "2", information of the telephone number "0180022203" can be represented as "203". An example of a plurality of answer choice data in the present example is illustrated in FIG. 11C.

On the other hand, where telephone numbers which are represented by numbers like "0180000002", "0180000003", "0180000004", . . . obtained by successively adding the difference "1" to an initial value of the number "0180000001" as described above are used as voting destination numbers (telephone numbers for reception of responses), the first telephone number "0180000001" can be broadcast as "1" in a multiplexed condition, and then the difference "1" can be successively broadcast in a multiplexed condition. In this instance, where the difference is set to a predetermined fixed value as described above, if the data "1" of the first telephone number is broadcast in a multiplexed condition, then the data of the differences need not be broadcast in a multiplexed condition. Consequently, information of the telephone numbers can be broadcast in a multiplexed condition with a very small amount of information.

In the present example, as the question data, two kinds of question data are defined in accordance with the number of questions. In particular, when the number of questions is 10 or less, the packet identification code for the question data is determined to be "B" and each question number is represented by one of "0" to "9". However, when the number of questions is greater than 10, the packet identification code of the question data is determined to be "C", and each question number is represented by one of "00" to "99". In short, when the number of questions is equal to or less than 10, question data of the packet identification code "B" is broadcast, but when the number of questions is greater than 10, question data of the packet identification code "C" are broadcast.

Then, the plurality of answer choice data of the question data are followed by a separator "*" and further by check data for error detection. The check data are error detection data for all of the answer choice data, and an error detection technique, for example, a check sum can be used for the check data.

Subsequently to the check data, information of a response allowing time range is broadcast. In the present example, the response allowing time range can be set to 0 to 9 minutes. The question data come to an end with the information of the response allowing time range, and the packet end code "DD" is broadcast finally.

[2. Evaluation Data]

Figure 8:
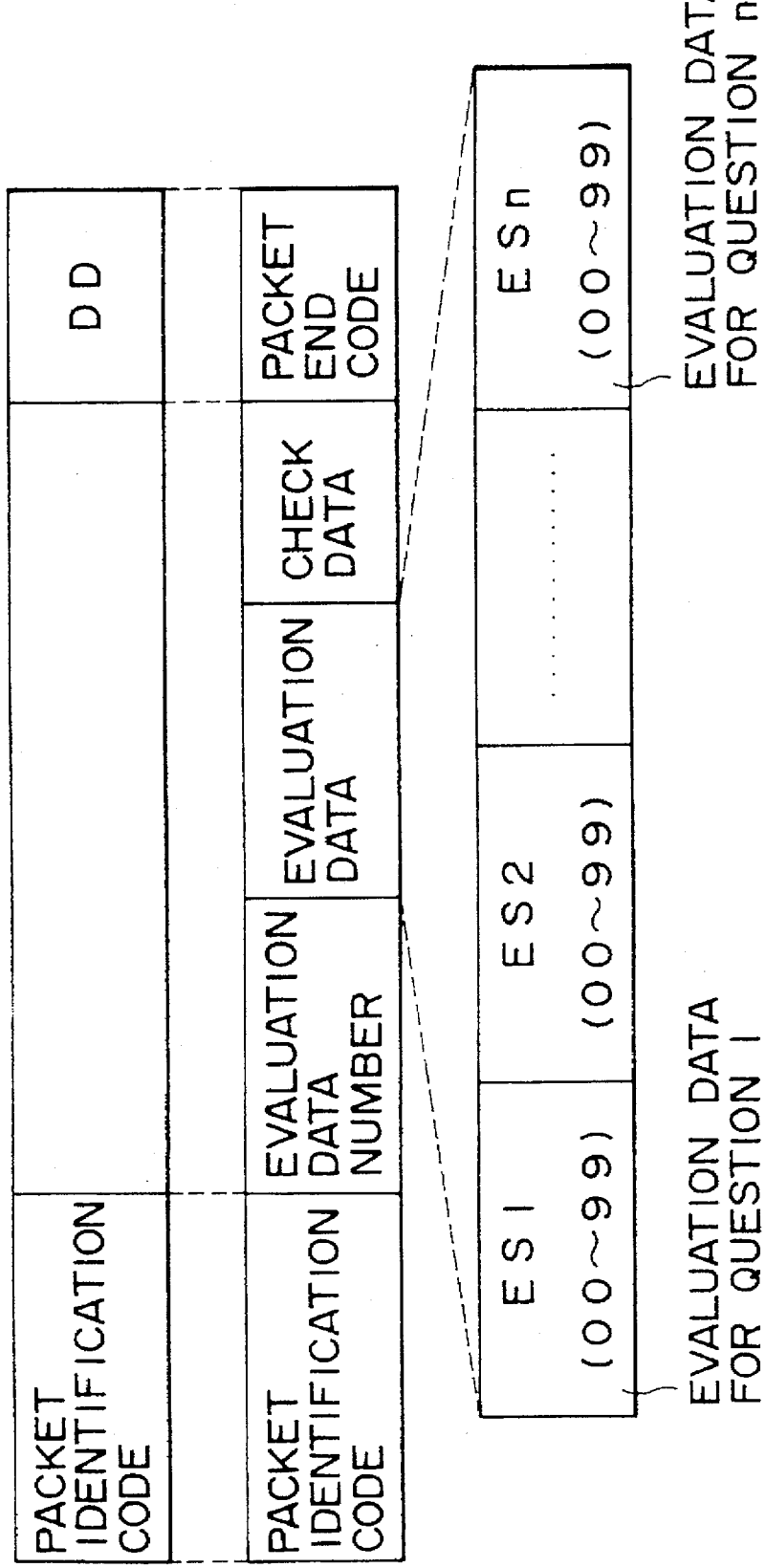
FIG. 8 is a diagrammatic view showing an example of a data structure of evaluation data.

FIG. 8 illustrates an example of the data structure of the evaluation data. Referring to FIG. 8, the symbol of "D" is assigned to the packet identification code of the evaluation data in the present example. The evaluation data identification code "D" is followed by information of a number of evaluation data. The evaluation data number corresponds to the number of questions and has a value from "00" to "99". Subsequently to the information of the evaluation data number, evaluation data ES1 to ESn (n is a natural number) corresponding to the questions 1 to n are broadcast. Here, the numeral following the characters ES corresponds to the number of the question. As each of the evaluation data ES1, ES2 . . . , one of a plurality of answer choices set for each of the questions is broadcast. For example, for a quiz, an answer choice number of a correct answer is broadcast.

Then, subsequently to the evaluation data ES1 to ESn, check data such as a check sum for detection of an error regarding the evaluation data ES1 to ESn are broadcast similarly to the case of the question data. The check data are followed by the packet end code "DD".

While the evaluation data of the example of FIG. 8 are an example when the number of answer choice numbers which make evaluation data for one question is one, a plurality of answer choice numbers as each evaluation data for a plurality of questions can be broadcast collectively by delineating evaluation data for each question by means of the separator "*".

[3. Selection Data]

Figure 9:
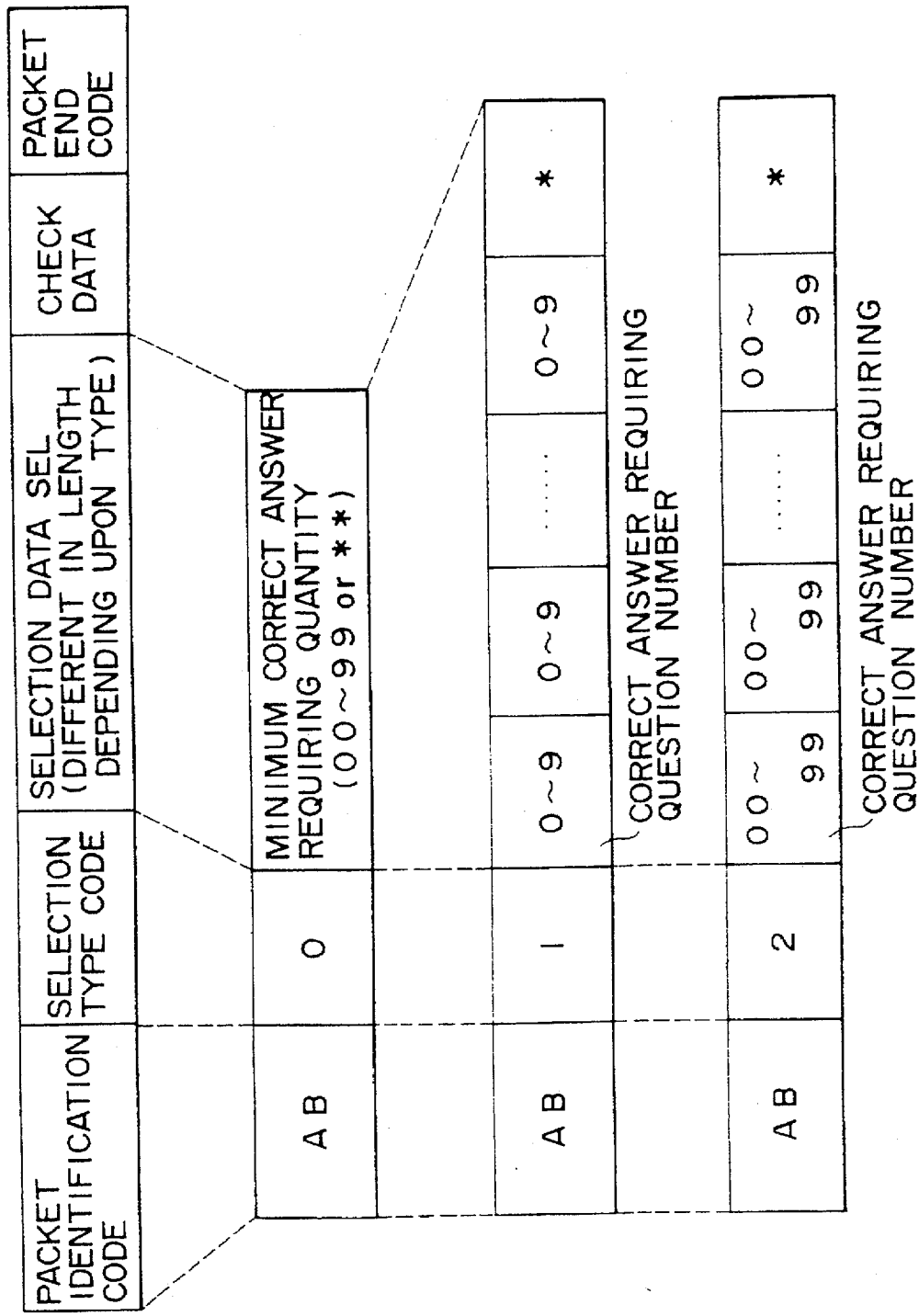
FIG. 9 is a diagrammatic view showing an example of a data structure of selection data.

FIG. 9 illustrates an example of the data structure of the selection data. Referring to FIG. 9, the symbol "AB" is assigned as the packet identification code of the selection data in the present example. Subsequently to the selection data identification code "AB", a selection type code is broadcast. In the present example, three kinds of type of selection codes are prepared for the selection type code, and accordingly, three different selection type codes "0", "1" and "2" are prepared in the present example. Then, subsequently to the selection type code, selection data SEL are broadcast, followed by check data, and the packet end code "DD" is broadcast finally.

In the present example, three kinds are prepared for the type of the selection code. When the selection type code is "0", it is intended to select a responding person if the responding person provides at least a minimum number of correct answers to a plurality of questions presented. The selection data SEL in this instance are the minimum number of questions to which correct answers must be provided (a minimum allowable correct answer number) and is represented by a value of two digits from "00" to "99" or by "". When the selection data SEL are "", all responding persons are selected.

When the selection type code is "1", the selection data are for question data of 10 or less questions broadcast with the packet identification code "B", and a plurality of question numbers to which a responding person is required to answer correctly are broadcast as the selection data SEL. In this instance, the correct answer requiring question number is a value of one digit from "0" to "9".

When the selection type code is "2", the selection data are for question data of eleven or more questions broadcast with the packet identification code "C", and similarly, a plurality of question numbers to which a responding person is required to answer correctly are broadcast. In this instance, the correct answer requiring question number is a value of two digits from "00" to "99".

[4. Selection Data]

FIG. 10 illustrates an example of the structure of the (selection+ID request) data. Referring to FIG. 10, the symbol of "BB" is assigned as the packet identification code for the (selection+ID request) data in the present example. The (selection+ID request) data have the same data structure as that of the selection data except that the packet identification code is different as seen from FIG. 10.

The (selection+ID request) data are different from the selection data in that they request the responding person side to send its identification information to the broadcasting station side. As hereinafter described, a receiver apparatus on the responding person side receiving the (selection+ID request) data sends identification information of the receiver apparatus or identification information of the responding person to the broadcasting station side by way of a telephone line when it is not restricted from a response.

[Broadcasting Procedure of Bidirectional Program Related Information]

Figure 12:
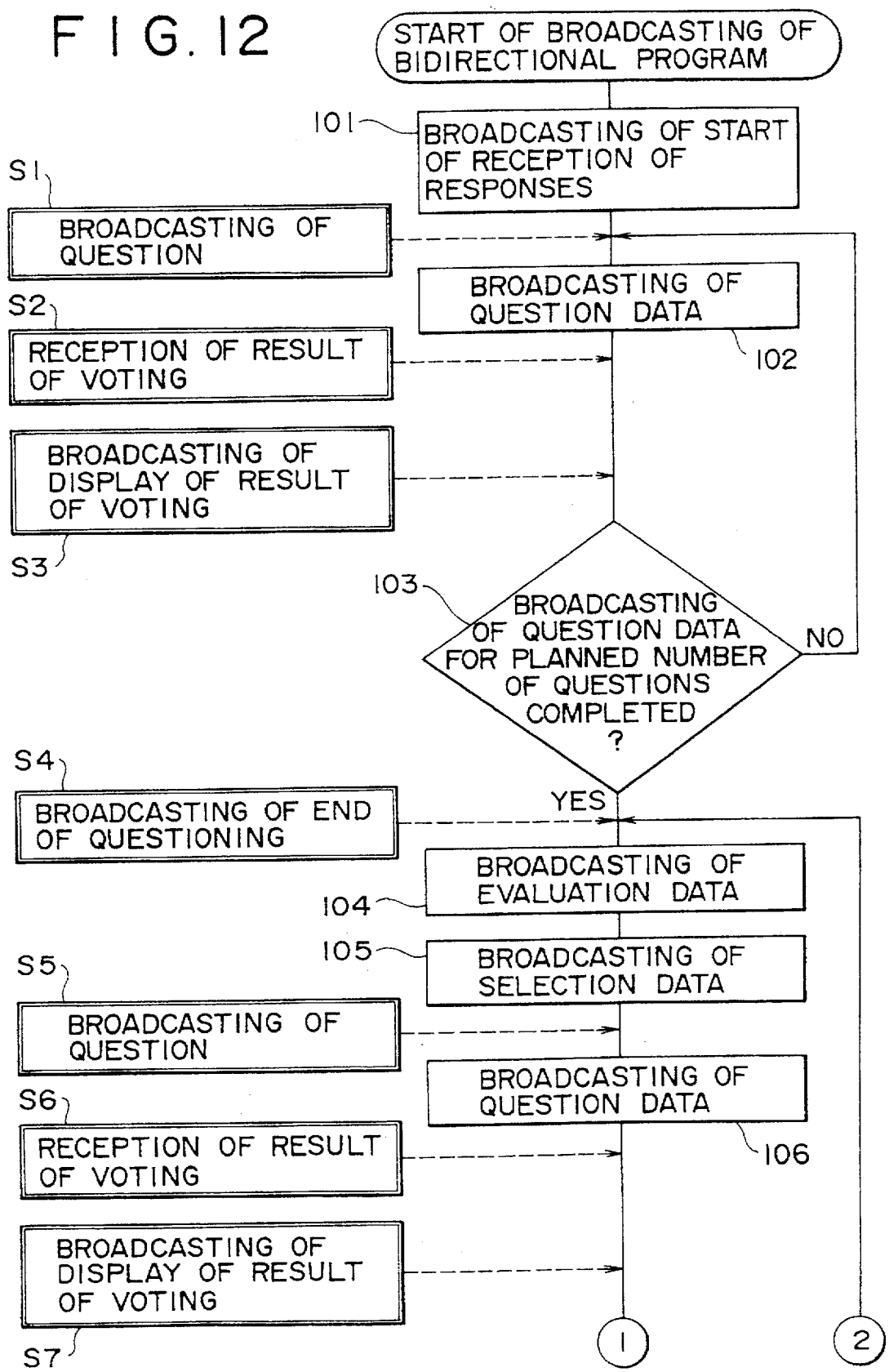
FIGS. 12 and 13 are flow charts illustrating broadcasting of bidirectional program information in a bidirectional broadcasting method to which the present invention is applied.
Figure 13:
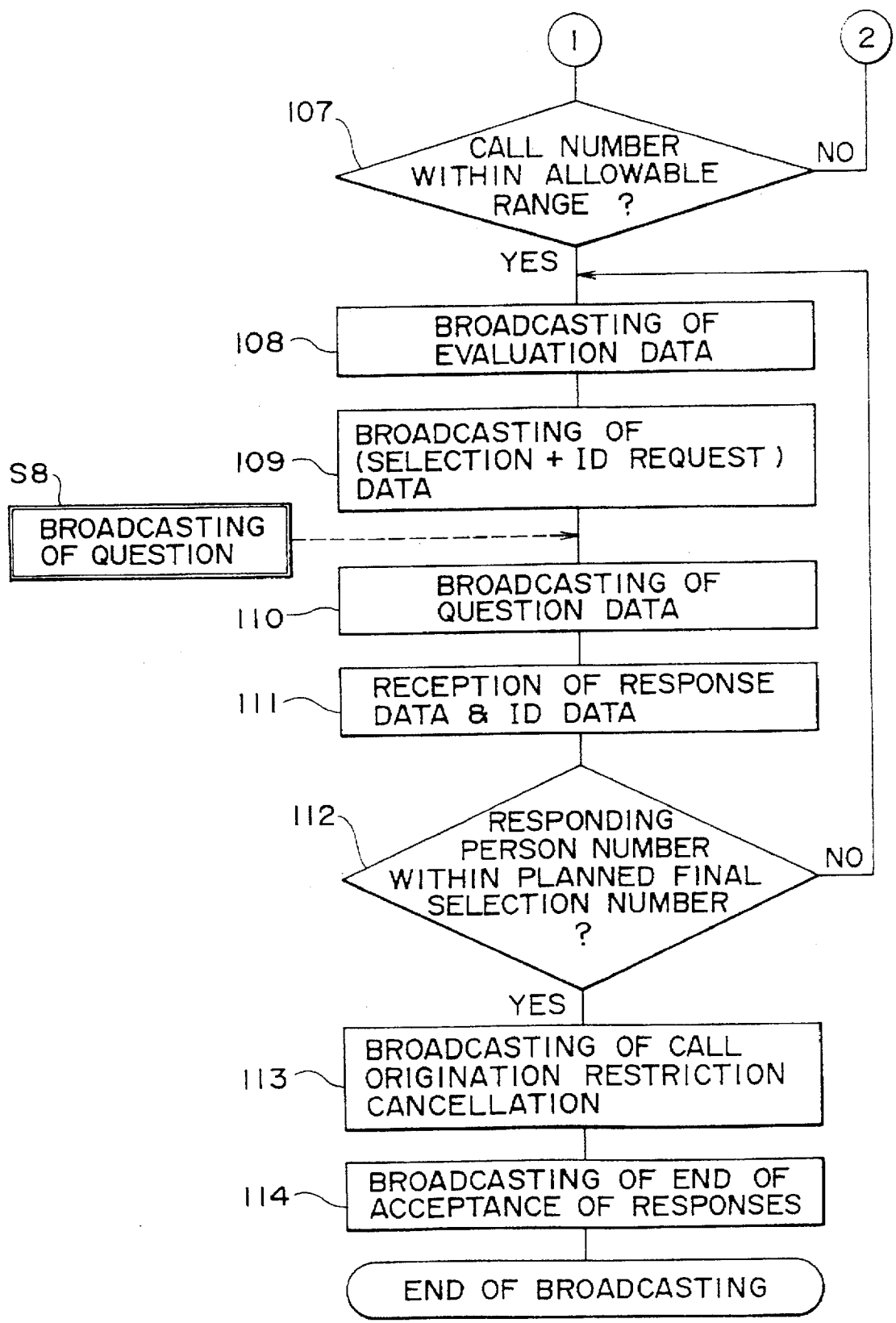
Figure 14:
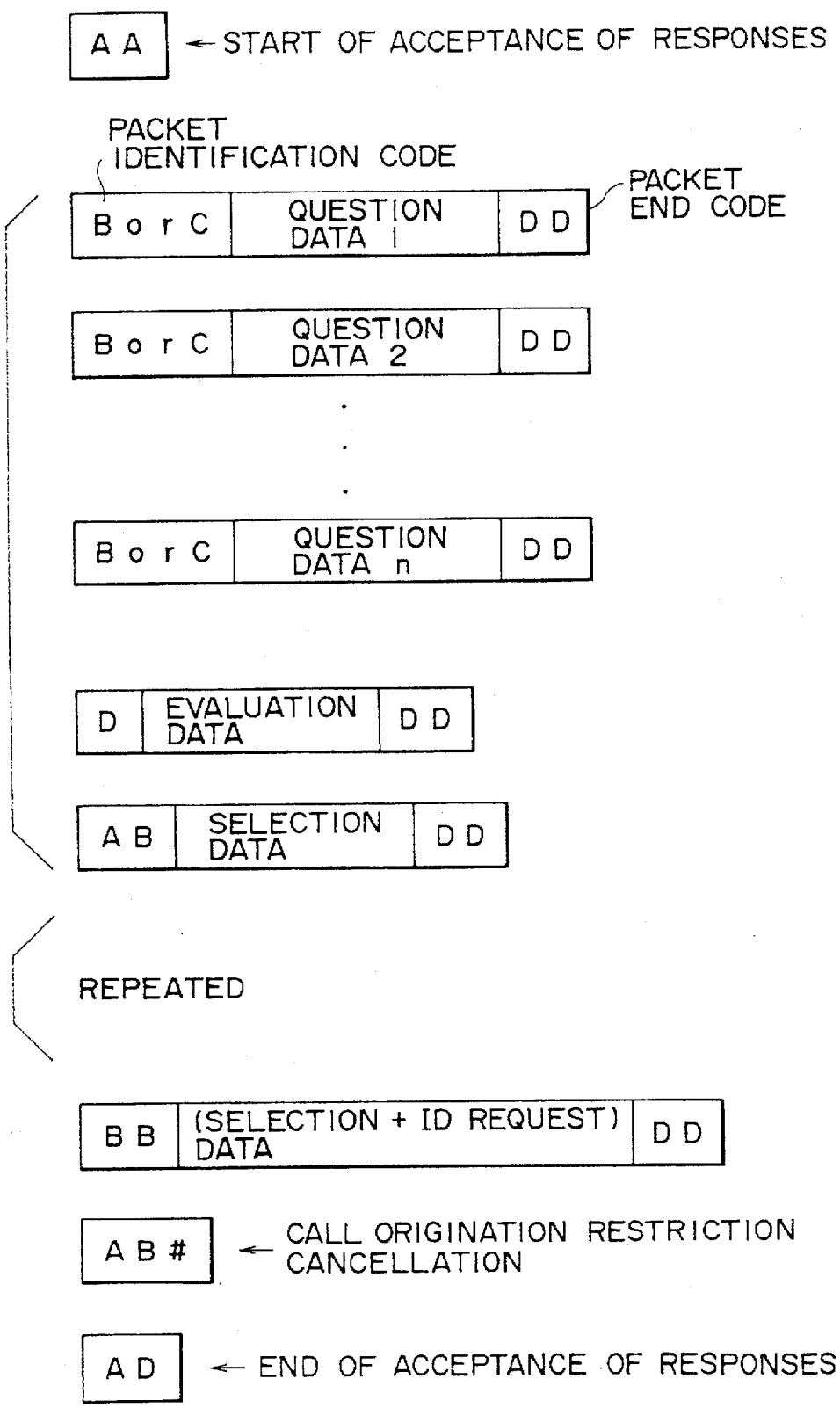
FIG. 14 is a diagrammatic view illustrating a flow of data upon broadcasting of the bidirectional broadcasting method illustrated in FIGS. 12 and 13.

FIGS. 12 and 13 are flow charts illustrating a procedure of the broadcasting station side for broadcasting bidirectional program related information. It is to be noted that each block indicated by double frames represents broadcasting or other operations in a broadcasting program performed by the broadcasting station and incidental to broadcasting of bidirectional program related information. FIG. 14 illustrates flows of question data, evaluation data, selection data, (selection+ID request) data and so forth which are program related information sent in this instance.

Referring first to FIG. 12, in order to start acceptance of responses on the broadcasting station side, control data for starting acceptance of responses are broadcast first (step 101). In the present example, the response acceptance starting control data are formed from two successive DTMF signals "AA" representing the symbol "A" as seen in FIG. 14.

Thereafter, when broadcasting (S1) of a question is performed in a program to be received by television receivers, question data regarding the question broadcast in the program are broadcast as a DTMF signal in a multiplexed condition with a broadcasting signal (step 102). To the question, responses from television viewers are received within the response allowing time range, and numbers of terminating calls (numbers of votes) to telephone numbers individually corresponding to a plurality of answer choices to the question are notified as voting results from the telephone voting service system of the central office to the broadcasting station. Consequently, the broadcasting station receives the voting results (S2). Then, the broadcasting station broadcasts the voting results in the program as seen in FIG. 12 (S3).

Then, the processing described above is repeated until broadcasting of a number of questions set in advance for the program is completed (step 103). After broadcasting of the preset number of questions is completed, it is broadcast in the broadcasting program that acceptance of responses is ended.

Thereafter, evaluation data for the plurality of individual questions thus broadcast are broadcast as a DTMF signal in a multiplexed condition with a broadcasting signal (step 104). Subsequently to the evaluation data, selection data for selection based on results of evaluation are broadcast (step 105).

Based on the evaluation data and the selection data, discrimination of selection of whether or not each receiver apparatus may be a response allowed person who can respond to a later question is performed by the receiver apparatus side as will be hereinafter in detail. Then, any receiver apparatus which has not been selected is restricted (for example, inhibited) from responding to a later question.

On the broadcasting station side, since broadcasting of a next question is performed in the program (S5), question data regarding the question are broadcast as a DTMF signal in a multiplexed condition with a broadcasting signal (step 106).

Figure 23:
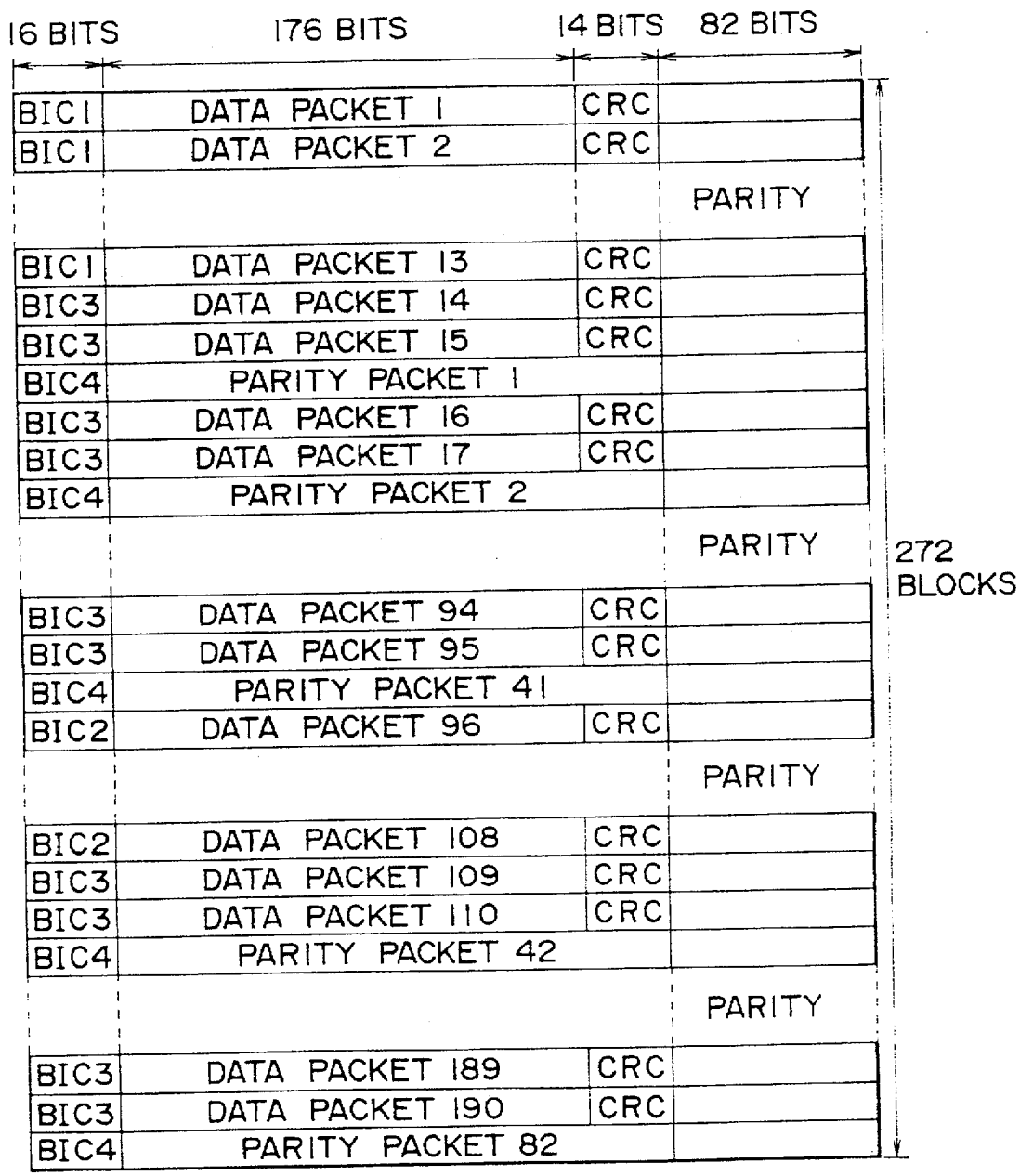
FIGS. 23 and 24 are diagrammatic views illustrating an FM multi-teletext broadcast.

To this question, responses from those television viewers whose receiver apparatus are not restricted from originating a call are received within a response allowing time range designated by the question data. Then, numbers (voting numbers) of terminating calls to the telephone numbers corresponding to the plurality of individual answer choices to the question are notified as results of voting to the broadcasting station from the telephone voting service system of the central office. Consequently, the broadcasting station receives the results of voting (S6). Then, the broadcasting station broadcasts the results of voting in the program as seen in FIG. 23 (S7).

Then, it is discriminated (step 107) whether or not a total vote number notified from the center office remains within a range of the originating call number allowed for a number of telephone lines prepared for the cut-through service of the telephone voting service (step 107). When the total vote number does not remain within the range of the allowed originating call number, the control sequence returns to step 104. Consequently, the evaluation data and the selection data for the responses performed based on the question data broadcast formerly at step 106 to the question broadcast at step S5 are broadcast (steps 104 and 105) to further reduce response allowed persons. Then, broadcasting of a next question (S5) and broadcasting of question data are performed (step 106).

Referring now to FIG. 13, when the total vote number from responding persons remains within the range of the allowable originating call number at step 107, the control sequence advances to step 108, at which evaluation data for responses to the last question is broadcast. Then, the control sequence advances to step 109, at which (selection and ID request) data are broadcast. In the meantime, on the receiver apparatus side, evaluation of the last response is performed based on the received evaluation data to perform selection.

Thereafter, since a next question is broadcast in the broadcasting program (S8), question data of the question are broadcast (step 110). The response allowed persons will respond to the question. In this instance, each receiver apparatus and the broadcasting station side are connected to each other directly by way of a telephone line by the cut-through service to allow a response. Consequently, identification information of the responding person side (identification information of the receiver apparatus or identification information of the responding persons) is sent to the broadcasting station side together with data of responses. The broadcasting station receives the thus sent information (step 111). In this instance, the broadcasting station can identify the individual responding persons based on the identification information of the responding persons.

Thereafter, the control sequence advances to step 112, at which it is discriminated whether or not the number of responding persons to the broadcasting of the question (S8) remains within a planned final selection number planned in advance by the broadcasting station. If the discrimination at step 112 is in the negative, the control sequence advances to step 108. Consequently, broadcasting of the evaluation data and broadcasting of the (selection+ID request) data are performed again (steps 108 and 109) to further reduce the number of response allowed persons. Thereafter, broadcasting of a further question (S8) and broadcasting of question data for the question (step 110) are performed, and response data from the further reduced response allowed persons and identification information of the responding persons are received (step 111).

When it is discriminated at step 112 that the number of responding persons to the question remains within the planned final selection number, the control sequence advances to step 113, at which information to cancel the call origination restriction of any receiver apparatus is broadcast and then it is broadcast that reception of responses is ended (step 114). The information of the cancellation of the call origination restriction is broadcast, in the present example, by multiplexing a DTMF signal of the symbol "AB#" with a broadcasting audio signal as seen in FIG. 14. Further, the information of the ending of reception of responses is broadcast by multiplexing a DTMF signal of the symbol "AD" with a broadcasting audio signal.

On the receiver side, when the information of the cancellation of the call origination restriction is received, if the receiver apparatus has been restricted from call origination, then the restriction is cleared so that the receiver apparatus can thereafter respond to next questions from the beginning. Then, when the information of the ending of reception of responses is received, also the history of responses till then is cleared. Otherwise, when the information of the cancellation of the call origination restriction is received, also the response history may be cleared. In this instance, however, since a program of the repechage type wherein the call origination restriction is canceled once cannot be provided, it is better to clear the response history on the receiver side after the information of the ending of reception of responses is received as in the present example.

In this manner, the number of response allowed persons can be reduced by repeating broadcasting of a question, broadcasting of question data including information of responding destination telephone numbers regarding the question, broadcasting of evaluation data for responses to the question and broadcasting selection data.

Then, after such reduction of the number of response allowed persons is performed until it becomes possible to avoid overcrowding of telephone lines, a request for transmission of identification information is broadcast to the responding persons in a multiplexed condition with a broadcasting signal. Consequently, in order to allow responses to be transmitted from the receiver apparatus to the broadcasting station, the receiver apparatus and the broadcasting station can be connected to each other directly by way of telephone lines so that identification information of the responding persons can be sent to the broadcasting station together with response data.

In short, reduction of the number of response allowed persons is performed by such a telephone voting service, and then the thus reduced responding persons can be identified by the broadcasting station. Consequently, a bidirectional program of the premium type can be provided using the telephone voting service. Further, by using questions of the questionnaire type, reduction of responding persons such as to restrict responding persons to only the male or the female or to television viewers of a particular age group can be performed readily.

[Receiver Apparatus System]

Figure 15:
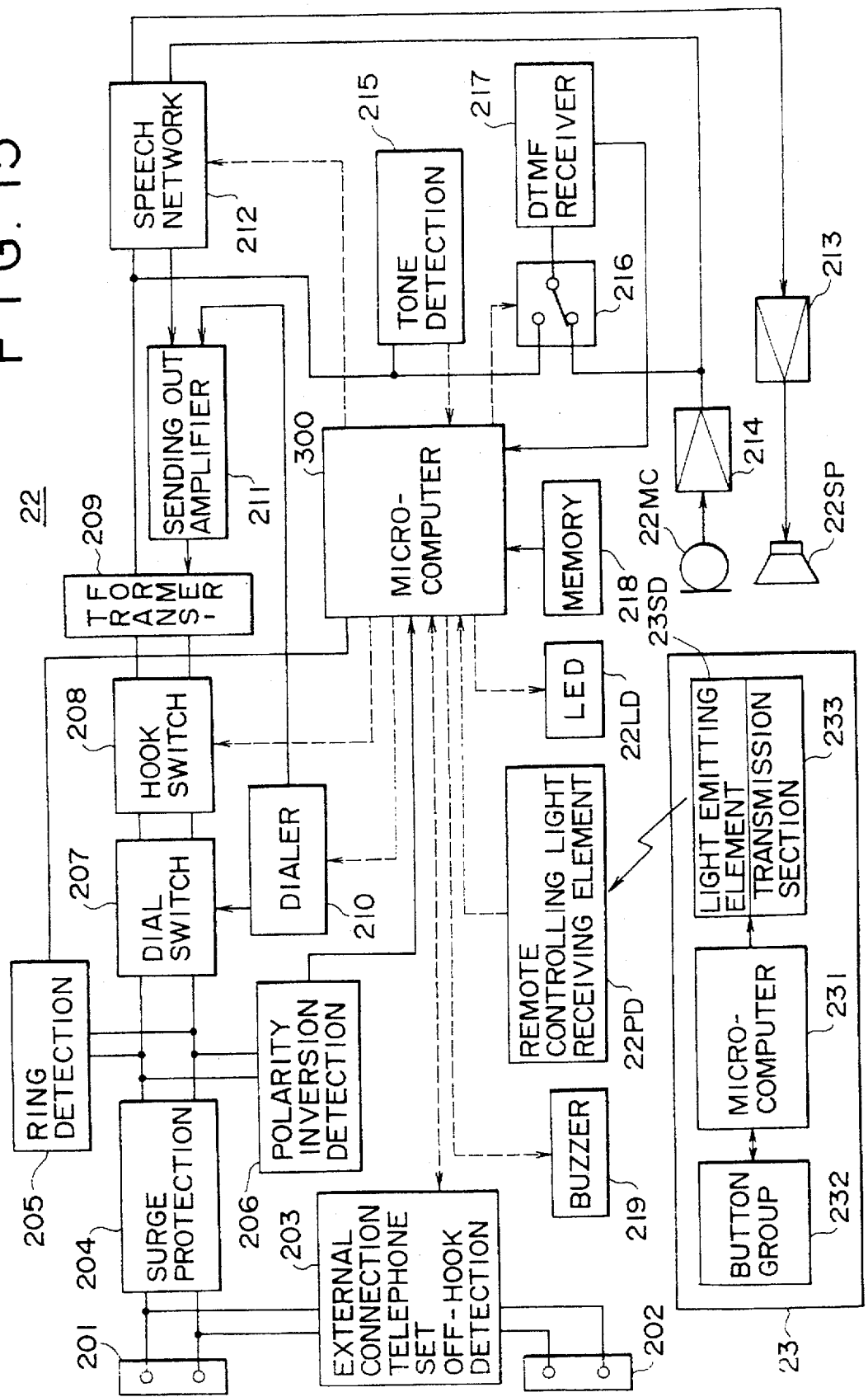
FIG. 15 is a block diagram of an example of the adapter apparatus of the receiver apparatus for a bidirectional broadcast shown in FIG. 1.

FIG. 15 shows an example of a detailed construction of the adapter apparatus body 22 and the remote commander 23 of the receiver apparatus system 20 shown in FIG. 1. Referring to FIG. 15, the adapter apparatus body 22 in the present embodiment has a function of sending a response to a bidirectional program by way of a telephone line (in the present example, a function of originating a call to one of telephone numbers corresponding to answer choices to a question), another function of collecting sound from the loudspeaker 21SP of the television receiver 21, extracting only DTMF tones from the thus collected sound and decoding bidirectional program related information, and a further function of receiving an infrared ray remote control signal from the remote commander 23.

Further, since the adapter apparatus body 22 of the present example must have the function of sending a response to a bidirectional program byway of a telephone line, this is utilized further positively so that it has another function as a hand-free telephone set which allows talking without the necessity of holding the transmitter/receiver in hand. First, an NCU (network control unit) system for the telephone set functions will be described.

The adapter apparatus body 22 includes a modular jack 201 on the telephone line side, and a modular jack 202 on the external connection telephone side. An off-hook detection circuit 203 for a telephone for external connection is connected between the modular jacks 201 and 202. The off-hook detection circuit 203 for a telephone for external connection detects, when an off-hook condition occurs with a telephone for external connection connected to the modular jack 202, such off-hook condition and notifies a detection output to a microcomputer 300.

The modular jack 201 on the telephone line side is connected to a surge protection circuit 204, a ring detection circuit 205 and a polarity inversion detection circuit 206 and connected also to a transformer 209 by way of a dial switch 207 and a hook switch 208. Here, the telephone line side and the microcomputer 300 side are isolated from each other.

The ring detection circuit 205 detects, upon termination of a call by way of a telephone line, a call signal wherein a voltage of 75 volts of a frequency of 16 Hz appears intermittently, and notifies a detection output to the microcomputer 300.

The polarity inversion detection circuit 206 detects inversion of the polarity of the telephone line and notifies a detection output to the microcomputer 300. Consequently, the microcomputer 300 recognizes that the line has been connected, that is, the originating call has been terminated.

The dial switch 207 dials based on a type of a line and dial data sent thereto from the microcomputer 300 by way of a dialer 210 upon origination of a call. The line type is set by the user on a line type setting dip switch not shown. The microcomputer 300 controls, if the set line type is a dial line, the dial switch 207 by way of the dialer 210 to perform dialing with pulses of 10 pps/20 pps. However, if the set line type is a PB line (push-button line), then the microcomputer 300 dials to a sending out amplifier 211 with a PB signal (DTMF signal) by way of the dialer 210.

When the adapter apparatus body 22 and the remote commander 23 are used as a hand-free telephone set, key operations of a telephone number inputted by the user are received by the microcomputer 300, and the microcomputer 300 sends out dial data. On the other hand, when the adapter apparatus body 22 and the remote commander 23 are used as a response operation apparatus to a bidirectional broadcasting program, responding destination telephone numbers stored in a memory of the microcomputer 300 (telephone numbers for individual answer choices sent thereto as bidirectional program information from the broadcasting station) are read out, sent out from the microcomputer 300 and automatically dialed.

The hook switch 208 performs switching between an on-hook (line releasing) condition and an off-hook (dc loop closing) condition under the control of the microcomputer 300. In the present example, switching of the hook switch 208 is performed in response to the off-hook button 23b or the on-hook button 23a of the remote commander 23.

A speech network 212 is a channel circuit which performs two-line/four-line conversion. The speech network 212 supplies voice of the other party (received voice) sent thereto from the telephone line by way of the transformer 209 to the loudspeaker 22SP by way of a loudspeaker amplifier 213, and sends out voice (voice to be transmitted) collected by way of the microphone 22MC and received by way of a microphone amplifier 214 to the telephone line by way of the transformer 209.

The received voice from the transformer 209 is supplied to a tone detection circuit 215. The tone detection circuit 215 detects various call progress tones such as a busy tone, a ring back tone and a dial tone and notifies a thus detected tone to the microcomputer 300.

The adapter apparatus body 22 further includes a DTMF receiver 217 which extracts a DTMF signal from an input signal thereto and decodes it into information of a numerical value or values and/or a symbol or symbols #, *, A, B, C and D. One of received voice received by way of the transformer 209 and voice collected by the microphone 22MC and received by way of the microphone amplifier 214 is switchably selected by a switch circuit 216 and inputted to the DTMF receiver 217. The switch circuit 216 is switched in response to a switching signal from the microcomputer 300 so that it selects, when no talking is performed, the audio signal from the microphone amplifier 214, but selects, during talking, the received audio signal from the transformer 209.

The decoded signal of the DTMF signal from the DTMF receiver 217 is supplied to the microcomputer 300. The microcomputer 300 performs extraction of such question data, evaluation data, selection data and (selection+ID request) data as described above from the decoded signal of the DTMF signal and performs processing based on the thus extracted data. This processing will be hereinafter described in detail.

The microcomputer 300 has a configuration of a one-chip microcomputer and includes a CPU, a ROM in which programs and fixed data are stored, and a non-volatile RAM and/or a volatile RAM. Then, in the present example, an ID memory 218 is externally connected to the microcomputer 300. The ID memory 218 is formed from an electrically erasable and writable ROM and has identification information (hereinafter referred to as simply as ID) peculiar to the receiver apparatus set therein upon shipment from a factory. Further, a user ID is set into the ID memory 218 by an inputting operation of the user. As such user ID, a telephone number of the user may be registered.

A display element 22LD is used to display an on/off state of the power source to the adapter apparatus body 22, a cut-through condition of the telephone voting service in reception and decoding of a DTMF signal required for a response, and a telephone number of a responding destination. Lighting, extinction or blinking of the display element 22LD is controlled by the microcomputer 300.

The remote controlling light receiving element 22PD receives an infrared ray remote control signal from the remote commander 23 and notifies the remote control signal to the microcomputer 300. The microcomputer 300 decodes the remote control signal by means of a built-in demodulator thereof.

The remote commander 23 includes a one-chip microcomputer 231, a button group 232 including numeric and other buttons 23K, the on-hook button 23a and the off-hook button 23b, and a transmission section 233 including a light emitting element. The microcomputer 231 scans the button group 232 in a fixed period to detect depression of one of the buttons of the button group 232. When depression of a button is detected, the microcomputer 231 transmits a remote control signal corresponding to the thus depressed button to the transmission section 233. The transmission section 233 transmits the remote control signal as infrared rays from the light emitting element thereof to the light receiving element 22PD of the adapter apparatus body 22.

The adapter apparatus body 22 further includes an alarming buzzer 219 which is used to notify, when a user performs a responding operation while the receiver apparatus is restricted from responding or outside a limited time, that the operation is an inappropriate responding operation. The alarming buzzer 219 is controlled by the microcomputer 300.

[Use of Adapter Apparatus as Hand-Free Telephone Set]

When the user wants to use the adapter apparatus as a hand-free telephone set to originate a call, the user will first depress the off-hook button 23b of the remote commander 23 and then operate the ten-key buttons 23K to dial or input a destination telephone number. Consequently, the microcomputer 231 of the remote commander 23 detects the destination telephone number and, for example, lights a light emitting diode (LED) embedded in the off-hook button 23b to display an off-hook condition. Further, the microcomputer 231 notifies information of the depression of the off-hook button 23b to the microcomputer 300 of the adapter apparatus body 22 by way of the transmission section 233 and thereafter notifies the information of the telephone number.

The microcomputer 300 thus displays the telephone number on the display element 22LD and controls the NCU system described above to dial the telephone number of the other party. Then, when a response of the other party is received, a dc loop is closed to establish a talking enabled condition. In the talking enabled condition, the user will send a talking audio signal from the microphone 22MC and listen to a received audio signal from the other party from the loudspeaker 22SP.

When the talking comes to an end, the on-hook button 23a will be depressed. Consequently, the microcomputer 231 extinguishes the LED of the off-hook button 23b and lights, for example, an LED embedded in the on-hook button 23a for a time while the on-hook button 23a is held depressed. Then, the remote commander 23 notifies information of the depression of the on-hook button 23a to the microcomputer 300 of the adapter apparatus body 22. The microcomputer 300 receives the information and restores a released condition of the line.

On the other hand, when it is tried to receive a terminating call from the other party by means of the adapter apparatus as a hand-free telephone set, the user will depress the off-hook button 23b. The adapter apparatus body 22 thus receives a remote control signal of the off-hook button 23b from the remote commander 23 and performs closing of the dc loop to establish a talking enabled condition. Thereafter, a process substantially similar to that upon origination of a call proceeds. The adapter apparatus can be used in such a manner as described above as a hand-free telephone set.

[Reception of and Response to Bidirectional Program Related Information]

When it is intended to receive and extract DTMF tones from sound produced from the loudspeaker of the television receiver, the microphone 22MC of the adapter apparatus body 22 will be directed to the loudspeaker of the television receiver 21.

When the on-hook button 23a or the off-hook button 23b is not operated, since the switch circuit 216 is held switched to the microphone amplifier 214 side, the DTMF receiver 217 extracts DTMF tones included in sound produced from the DTMF receiver 217. A decoded signal of the DTMF signal from the DTMF receiver 217 is supplied to the microcomputer 300.

Figure 16:
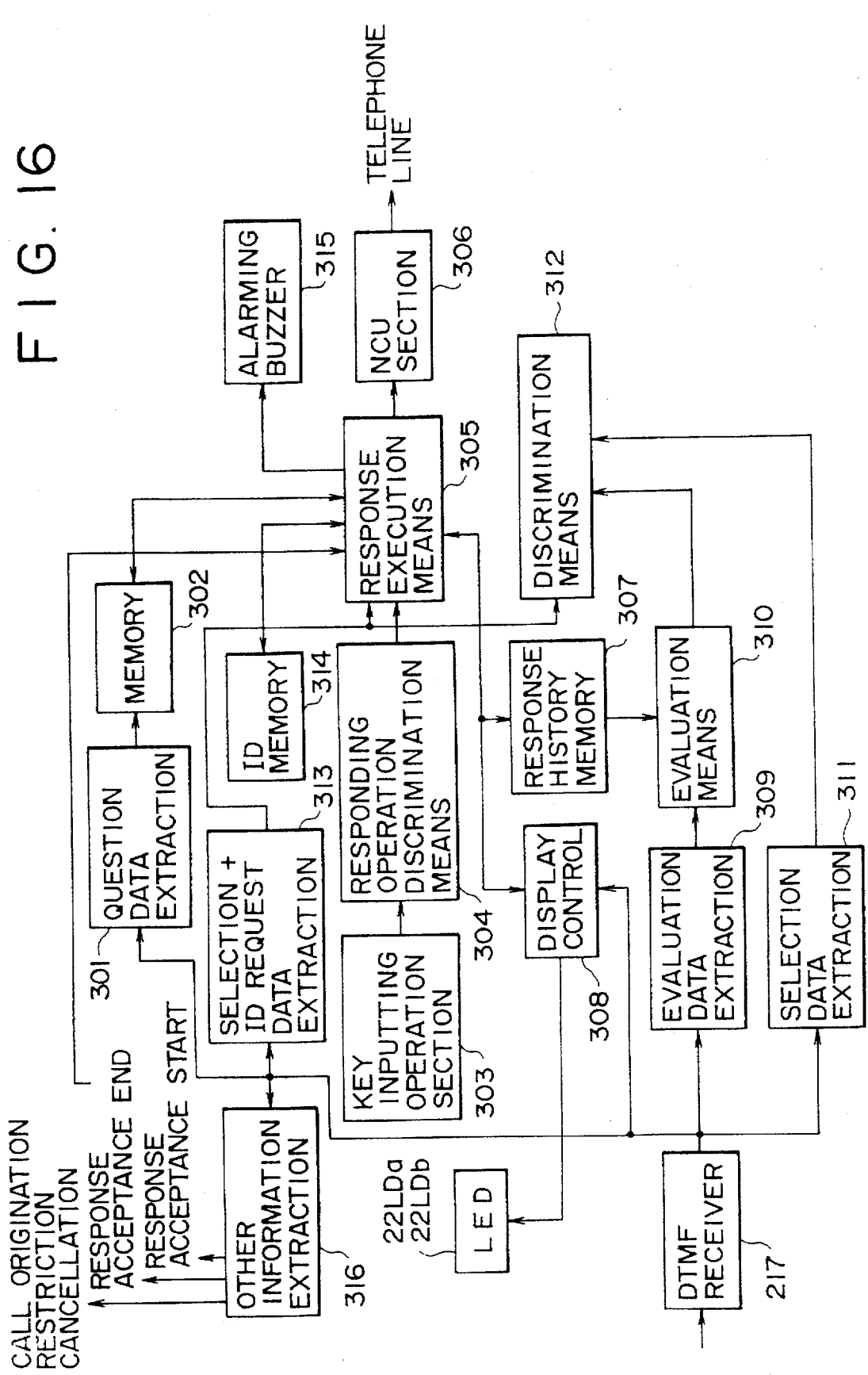
FIG. 16 is a functional block diagram for responding processing of the adapter apparatus of FIG. 15.

FIG. 16 is a functional block diagram of the processing function of the DTMF signal by the microcomputer 300. If the response acceptance starting instruction of "AA" is received by an other information extraction section 316 of the microcomputer 300, then the microcomputer 300 places the adapter apparatus body 22 from a stand-by condition into a reception enabled condition for various packet data for a response. Further, the microcomputer 300 notifies an acceptance allowing instruction for a responding operation to response execution means 305 and performs initialization of the memory and other components thereof.

Then, if the other information extraction section 316 receives the response acceptance ending instruction of "AD", then it places the adapter apparatus body 22 from the reception enabled condition for various packet data for a response (hereinafter referred to merely as reception enabled condition) into a stand-by condition and notifies this to the response execution means 305. In response to reception of the response acceptance ending instruction, the response execution means 305 thereafter rejects acceptance of a responding operation. Further, if the other information extraction section 316 receives the response restriction canceling instruction of "AB#", then it notifies this to the response execution means 305. The response execution means 305 receives this and cancels, if a call origination restriction to a response has been applied to the telephone set, the call origination restriction to a response.

Then, the microcomputer 300 extracts, in the reception enabled condition, question data, evaluation data, selection data and (selection+ID request) data, which are bidirectional program related information, and executes the following processing.

In particular, question data extraction means 301 extracts question data from a decoded signal of a DTMF signal from the DTMF receiver 217 and stores a question number, answer choice numbers and corresponding responding destination telephone numbers into a memory 302. Notification of completion of such registration into the memory 302 is sent to display control means 308 by way of the response execution means 305. The display control means 308 controls a light emitting element 22LDb to be lit to notify to the user that data for a response have been decoded and fetched.

After such lighting of the light emitting element 22LDb is confirmed, the user (responding person) will perform a responding operation byway of a key inputting operation section 303. The responding operation is a manual operation to input one or a plurality of required ones of a plurality of answer choices given for a broadcast question. The responding operation is performed using the buttons 23K of the remote commander 23. Upon such responding operation, this is discriminated by responding operation discrimination means 304. Actually, the microcomputer 300 fetches a remote control signal from the remote commander 23 by way of the remote controlling light receiving element 22PD and discriminates the responding operation.

Data of the number of an answer choice of a result of the discrimination is sent to the response execution means 305. The response execution means 305 refers to the memory 302 to read out a responding destination telephone number assigned to the answer choice number for the question, and an NCU section 306 automatically dials the responding destination telephone number to originate a call for a response. In this instance, the response execution means 305 sends the answer choice number selected by the user and the automatically dialed telephone number information to the display control means 308. The display control means 308 displays the selected answer choice number and the responding destination telephone number on a display element 22LDa.

In this instance, the response execution means 305 measures the time since the question data were acquired and also discriminates whether or not a responding operation has been performed within a response allowing time range in the question data by the user. Then, if the responding operation is performed at a point of time later than the response allowing time range, then an alarming buzzer 315 (alarming buzzer 219 in FIG. 15) is activated to notify the user that the responding operation is a response error.

Then, when a call for a response is originated, the history of the response is written into a response history memory 307. As the information of the history of the response, for example, the question number as an object of the response and the answer choice number inputted by the responding operation are stored.

In this manner, the responding person can respond to each question only by selecting an answer choice number and manually operating a button or buttons. No manual operation of the off-hook button 23b is required. Then, in the present example, the response makes use of the telephone voting service and comes to an end when termination of the call to a subscriber exchange of the central office is completed. Accordingly, only a minimum charge for use of a telephone line is required. It is to be noted that a notification of completion of acceptance is sent as an audio message to the user (responding person) from the central office, and consequently, the user can know completion of the response from the audio message. The adapter apparatus body 22 may be automatically put into an on-hook (line releasing) condition in response to disconnection of the line on the central office side or may be put into an on-hook condition after the termination of the call to the central office is confirmed.

When the response allowing time to the question elapses, numbers of terminating calls of responses for the individual answer choices are notified from the central office to the broadcasting station as described above. Consequently, the broadcasting station subsequently sends evaluation data in a multiplexed condition with a broadcasting signal. Since sound of the evaluation data are emitted in a mixed condition with a broadcasting audio signal from the loudspeaker of the television receiver, it is collected by the microphone 22MC of the adapter apparatus body 22 and decoded by the DTMF receiver 217. Then, the evaluation data are extracted and decoded by evaluation data extraction means 309 and sent to evaluation means 310.

The evaluation means 310 compares the thus received evaluation data with the information of the response history of the response history memory 307 to evaluate the response and sends a result of the evaluation to discrimination means 312.

Then, since selection data are subsequently sent in a mixed condition with a broadcasting signal to the receiver apparatus, the DTMF signal is decoded by the DTMF receiver 217 and the selection data are extracted and decoded by selection data extraction means 311 in a similar manner as described above. Then, the thus decoded selection data are sent to the discrimination means 312.

The discrimination means 312 determines, based on the result of the evaluation sent thereto from the evaluation means 310 and the selection data, whether or not the user of the adapter apparatus body 22 is selected as a response allowed person to a next question. Then, a result of the determination is sent from the discrimination means 312 to the response execution means 305.

The response execution means 305 receives the result of the determination and thereafter restricts, in the present example, inhibits, origination of a call for a response when the user of the receiver apparatus has not been selected as a response allowed person. Then, the response execution means 305 sends information indicative of the call origination restricted condition to the display control means 308 so that the information is displayed on the display element 22LDa and the alarming buzzer 315 is driven to notify it to the user that a call origination restricted condition has been entered.

When it is determined by the discrimination means 312 that the user of the receiver apparatus has been selected as a response allowed person, the response execution means 305 waits for arrival of question data of a next question and a responding operation to the question. Then, the adapter apparatus body 22 performs processing from arrival of next question data to a responding operation of the user to the question in a similar manner as described above.

Then, the adapter apparatus body 22 processes evaluation data for the question broadcast subsequently in a similar manner as described above. Further, the adapter apparatus body 22 determines, based on selection data received subsequently, whether or not the user of the receiver apparatus is further selected as a response allowed person to a next question. If the user of the receiver apparatus is not selected as a response allowed person, then origination of a call for a response is thereafter restricted. But if the user of the receiver apparatus is selected as a response allowed person, then the adapter apparatus body 22 waits for arrival of subsequent question data and a responding operation to the question. Then, the adapter apparatus body 22 performs processing from arrival of next question data to a responding operation of the user to the question in a similar manner as described above.

The adapter apparatus body 22 processes evaluation data for the question broadcast subsequently in a similar manner as described above. Then, when (selection+ID request) data are to be broadcast and received subsequently, the data are extracted and decoded by selection+ID request) data extraction means 313, and the selection data of the thus extracted data are sent to the discrimination means 312. The discrimination means 312 refers to the data of the result of evaluation from the evaluation means 310 to determine whether or not the user of the receiver apparatus is selected as a response allowed person to a next question in a similar manner, and sends a result of the determination to the response execution means 305.

Further, the (selection+ID request) data extraction means 313 sends an ID sending out request to the response execution means 305. The response execution means 305 reads out, when the user of the receiver apparatus is selected as a response allowed person, in response to the ID sending out request, the ID (identification information) of the adapter apparatus body or the user ID from an ID memory 314 (ID memory 218 in FIG. 15) upon responding to the next question. The response execution means 305 sends the thus read out ID information together with the information of the response to the broadcasting station side. It is to be noted that, when the receiver apparatus is in a condition in which such (selection+ID request) data are sent from the broadcasting station thereto, since the response is performed by the cut-through service, the information of the response from the user and the ID information are sent directly to the broadcasting station side by way of a telephone line.

It is to be noted that, while the selection data extraction means 311 and the (selection+ID request) data extraction means 313 are shown as different blocks in the functional block diagram of FIG. 16, they may otherwise be constructed as a single block which extracts both of selection data, which are to be sent to the discrimination means 312, and ID information, which is to be sent to the response execution means 305 when an ID request is received.

Then, when call origination restriction cancellation information is received from the broadcasting station side, this is extracted and detected by the other information extraction section 316 of the adapter apparatus body 22. Then, when call origination restriction has been applied to the receiver apparatus at the response execution means 305, this is canceled. Consequently, even if call origination restriction is applied once, this can be canceled readily in response contents of a program broadcast from the broadcasting station, which allows provision of bidirectional programs of various forms. It is to be noted that, prior to broadcasting of an end of acceptance of responses of a bidirectional program, call origination restriction cancellation information is normally broadcast from the broadcasting station in order to clear the adapter apparatus body 22.

A response to a bidirectional program is performed in such a manner as described above. Subsequently, a flow of processing of the microcomputer 300 for the responding processing will be described below with reference to FIGS. 17 to 22.

Figure 17:
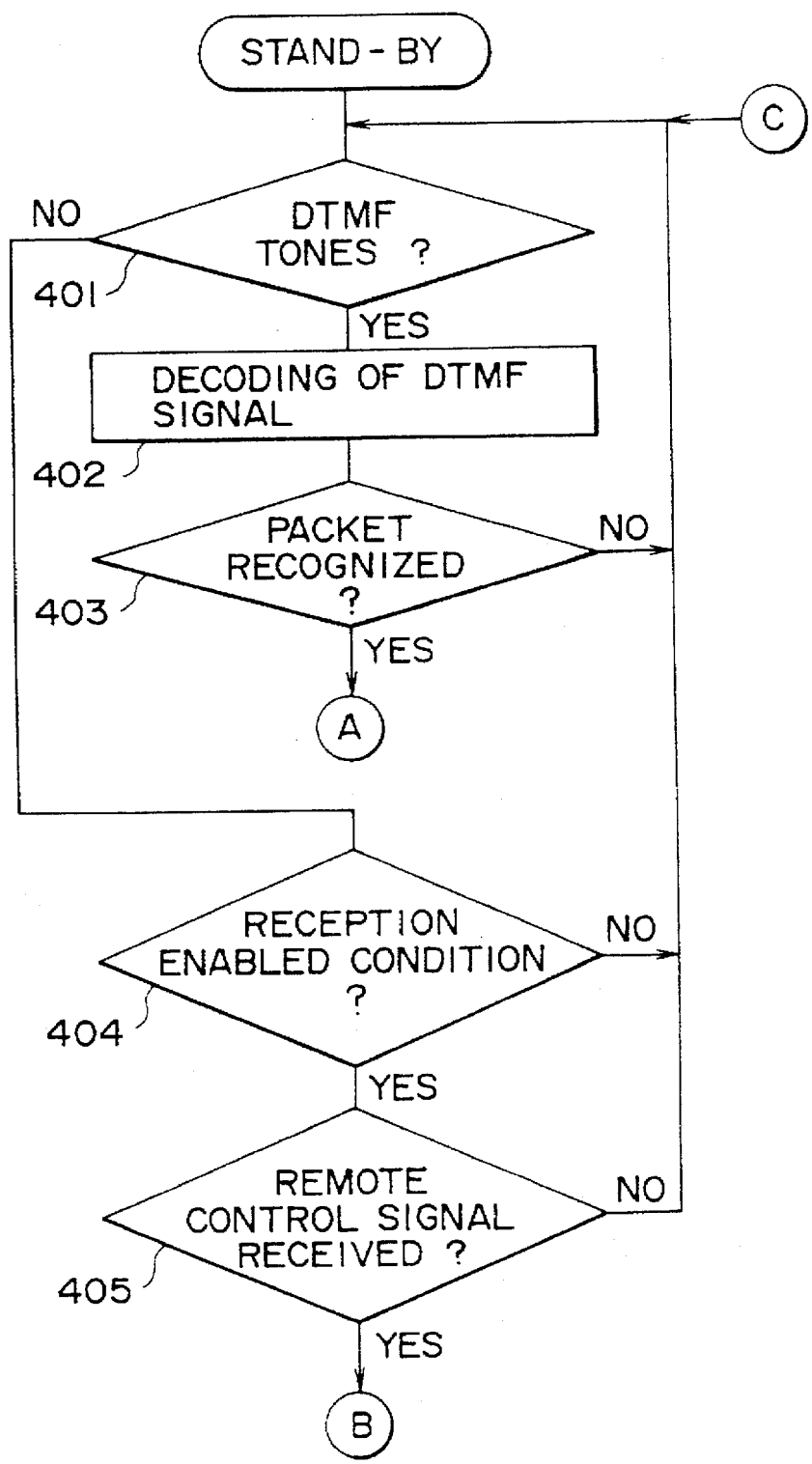
FIGS. 17 to 22 are flow charts illustrating processing of fetching of and responding to bidirectional program information by the receiver apparatus shown in FIG. 1.

Referring first to FIG. 17, the microcomputer 300 checks, for example, in a fixed period in its stand-by condition, whether or not DTMF tones are detected by the DTMF receiver 217 (step 401).

Figure 19:
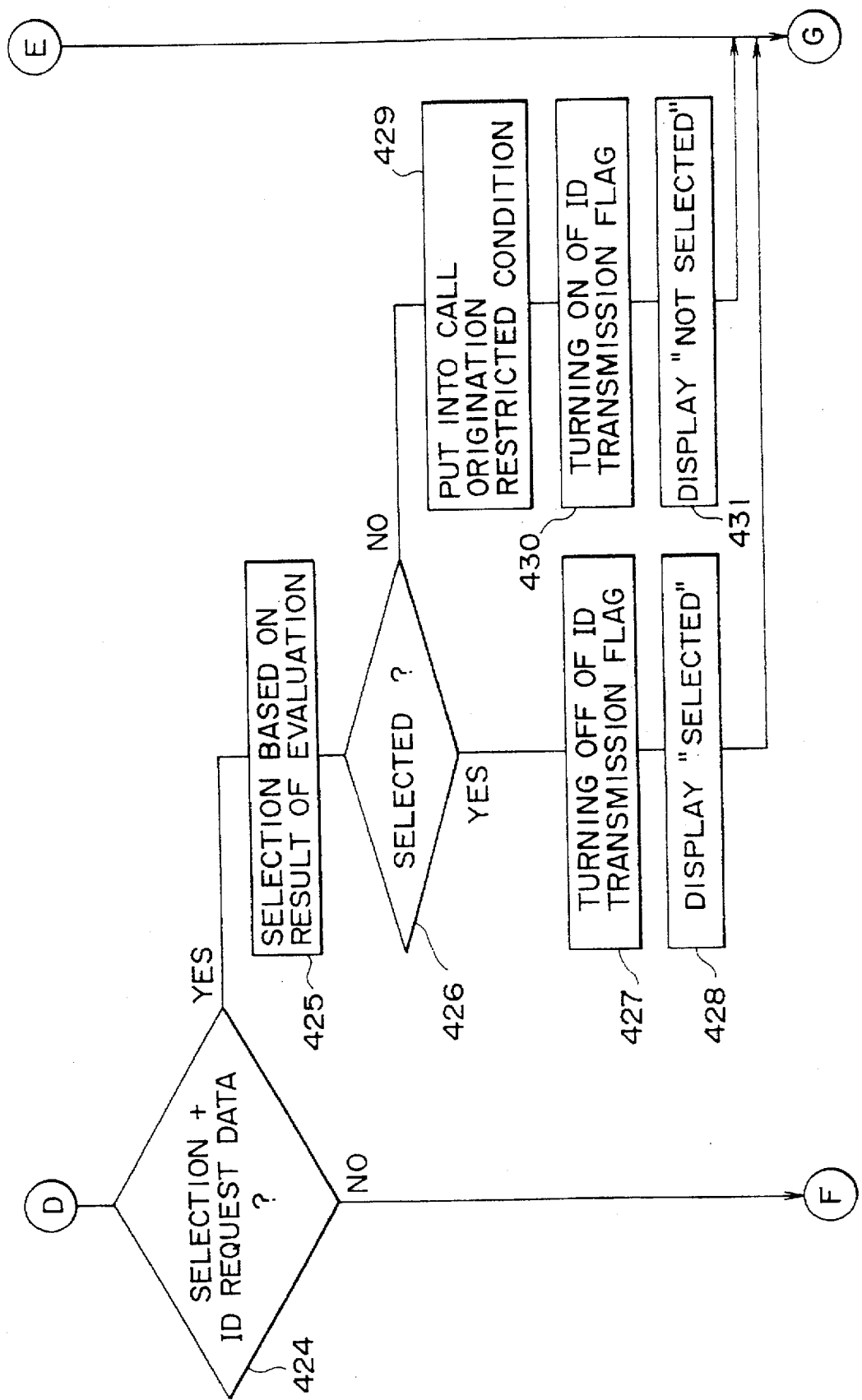
Figure 20:
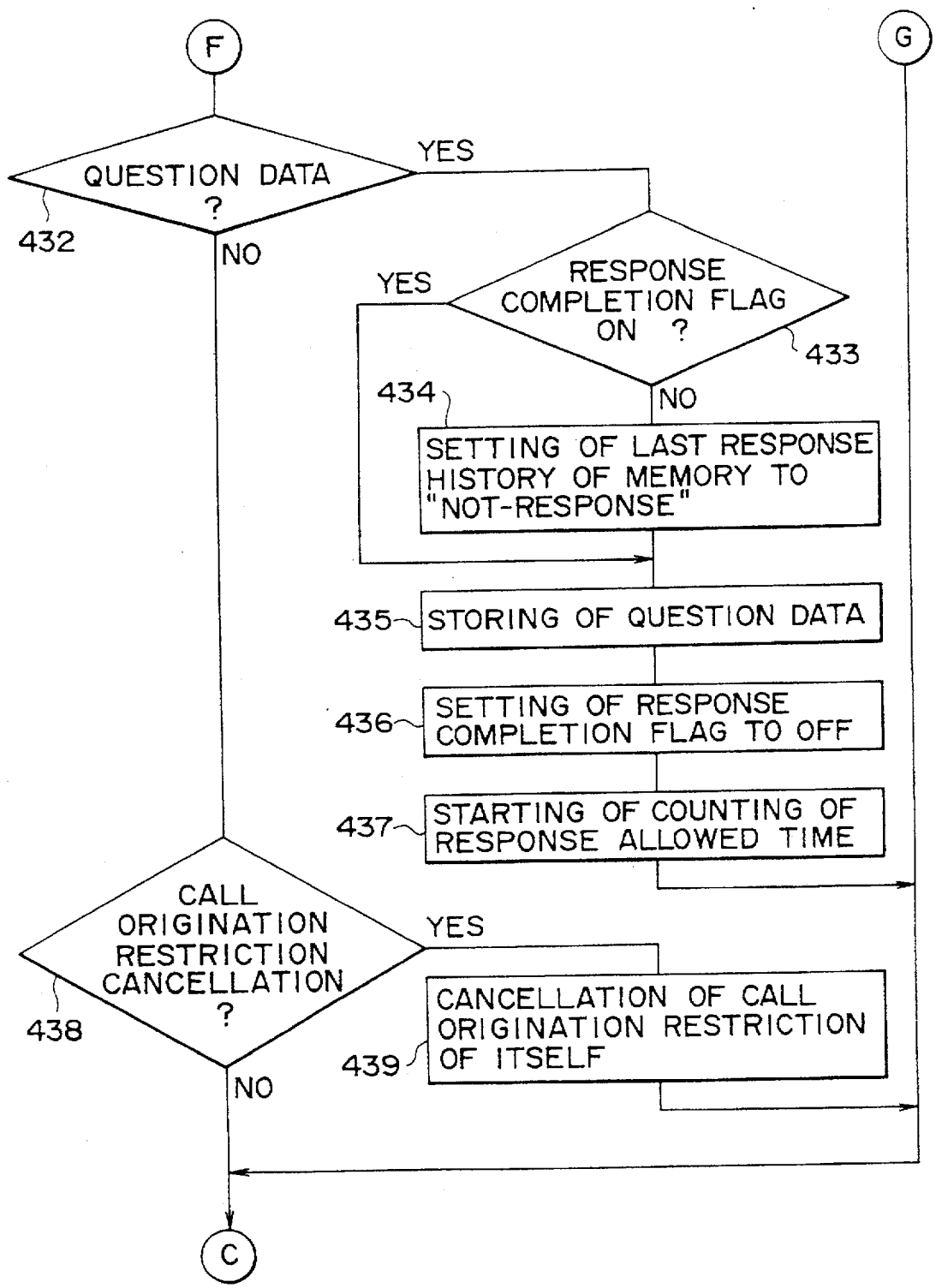

If DTMF tones are detected by the DTMF receiver 217 at step 401, then the DTMF signal is decoded (step 402), and it is discriminated whether or not the DTMF signal represents bidirectional program information such as a data packet of question data, evaluation data, selection data or the like or starting of acceptance of responses, ending of acceptance of responses or cancellation of call origination restriction (step 403). Then, if the DTMF signal is not such bidirectional program information, then the control sequence returns to step 401. On the other hand, if the discrimination at step 403 proves that the DTMF signal is bidirectional program information, then the control sequence returns to step 401 after the processing illustrated in FIGS. 18 to 20 is performed.

Figure 21:
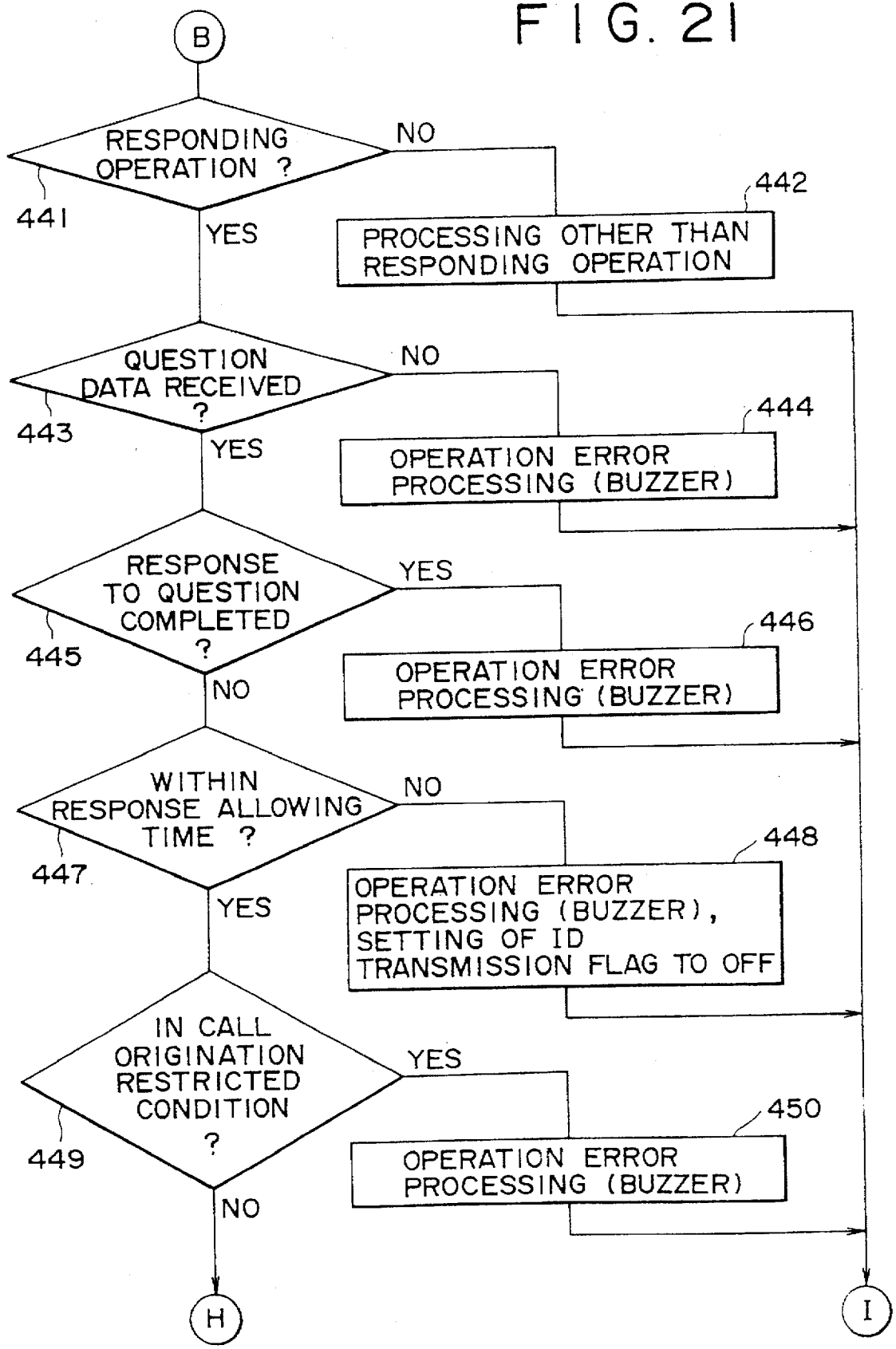
Figure 22:
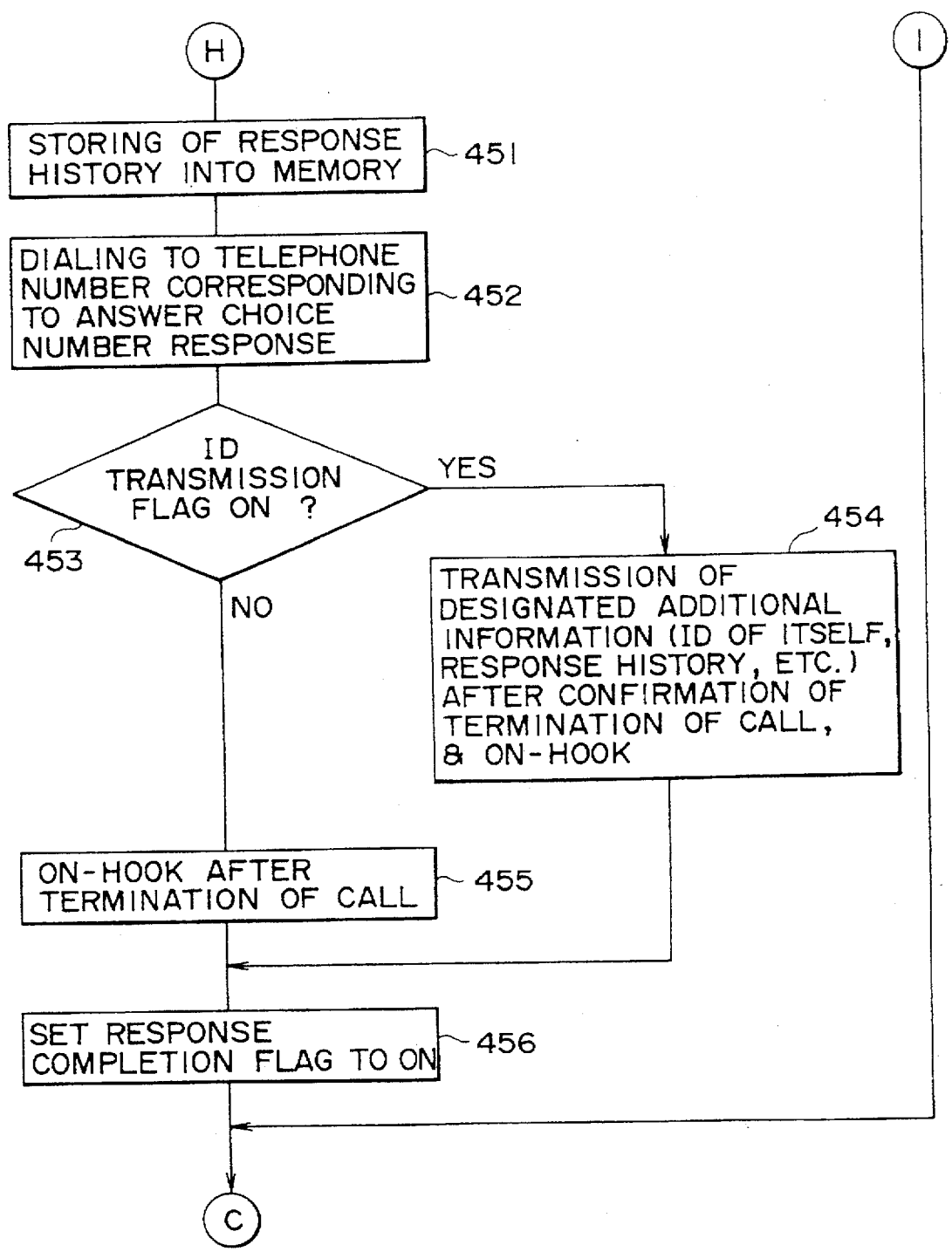

On the other hand, if it is discriminated at step 401 that no DTMF tone is detected by the DTMF receiver 217, then the control sequence advances to step 404, at which it is discriminated whether or not response acceptance starting information has been received and the receiver apparatus is in a reception enabled condition. If the receiver apparatus is not in a reception enabled condition, then the control sequence returns to step 401, but if the receiver is in a reception enabled condition, then the control sequence advances to step 405, at which it is discriminated whether or not a remote control signal has been received from the remote commander 23. If no remote control signal has been received, then the control sequence returns to step 401, but if a remote control signal has been received, then the control sequence returns to step 401 after the processing illustrated in FIGS. 21 and 22 is performed.

Subsequently, the processing illustrated in FIGS. 18 to 20 which is performed when DTMF signals are detected by the DTMF receiver 217 at step 401 and represent bidirectional program information will be described.

Figure 18:
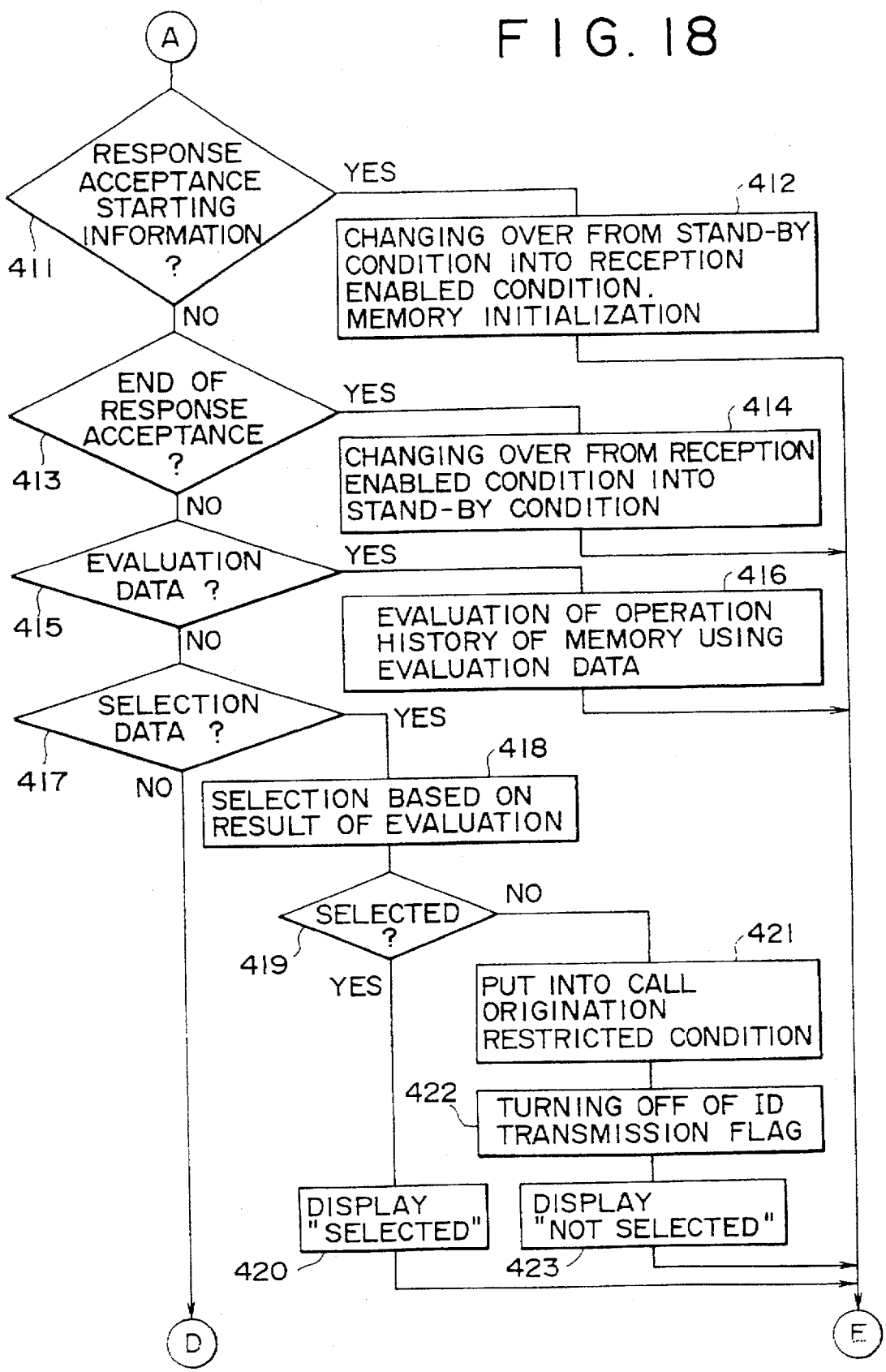

Referring first to FIG. 18, when it is discriminated at step 403 that the DTMF signals are bidirectional program information, it is discriminated that the bidirectional program information is the information "AA" representative of starting of acceptance of responses (step 411). Then, if the bidirectional program information is information of starting of acceptance of responses, then the control sequence advances to step 412, at which the adapter apparatus body 22 is changed over from a stand-by condition to a reception enabled condition and the memories (the memory 302 and the response history memory 307 in FIG. 16) are initialized. Thereafter, the control sequence returns to step 401.

If it is discriminated at step 411 that the bidirectional program information is not response acceptance starting information, the control sequence advances to step 413, at which it is discriminated whether or not the bidirectional program information is the information "AD" of ending of acceptance of responses. Then, if the bidirectional program information is the information of ending of acceptance of responses, then the control sequence advances to step 414, at which the adapter apparatus body 22 is changed over from a reception enabled condition into a stand-by condition. Thereafter, the control sequence returns to step 401.

If it is discriminated at step 413 that the bidirectional program information is not response acceptance ending information, the control sequence advances to step 415, at which it is discriminated whether or not the bidirectional program information is evaluation data. Then, if the bidirectional program information is evaluation data, then the control sequence advances to step 416, at which the operation history of the response history memory 307 is evaluated using the evaluation data. Thereafter, the control sequence returns to step 401.

If it is discriminated at step 415 that the bidirectional program information is not evaluation data, then the control sequence advances to step 417, at which it is discriminated whether or not the bidirectional program information is selection data. Then, if the bidirectional program information is selection data, then the control sequence advances to step 418. At step 418, selection of whether or not the user of the receiver apparatus should be selected as a response allowed person to a next question is performed based on the selection data and the result of the evaluation. Thereafter, the control sequence advances to step 419, at which a result of the selection is discriminated.

If the result of the discrimination at step 419 proves that the user of the receiver apparatus is selected, then the control sequence advances to step 420, at which the result of discrimination is displayed on the display element 22LDa or the like, whereafter the control sequence returns to step 401. On the contrary if the result of the discrimination at step 419 proves that the user of the receiver apparatus is not selected, then the control sequence returns to step 421, at which the adapter apparatus body 22 is put into a call origination restricted condition from a response. Then, the control sequence advances to step 422, at which an ID transmission flag for the user or the receiver apparatus is changed to an off state, and then to step 423, at which it is alarmed by means of the buzzer or displayed on the display element 22LDa that the user has not been selected. Thereafter, the control sequence returns to step 401.

When it is discriminated at step 417 that the bidirectional program information is not selection data, the control sequence advances to step 424. Referring now to FIG. 19, at step 424, it is discriminated whether or not the bidirectional program information is (selection+ID request) data. If the bidirectional program information is (selection+ID request) data, then the control sequence advances to step 425, at which selection of whether or not the user of the receiver apparatus should be selected as a response allowed person to a next question is performed based on the selection data and the result of evaluation. Thereafter, the control sequence advances to step 426, at which the result of the selection is discriminated.

If it is discriminated at step 426 that the user of the receiver apparatus is selected, then the control sequence advances to step 427, at which the ID transmission flag for the user or the receiver apparatus is changed to an on state. Then, the control sequence advances to step 428, at which it is displayed on the display element 22LDa that the user of the receiver apparatus is selected. Thereafter, the control sequence returns to step 401.

If it is discriminated at step 426 that the user of the receiver apparatus is not selected, the control sequence advances to step 429, at which the adapter apparatus body 22 is put into a call origination restricted condition from a response. Then, the control sequence advances to step 430, at which the ID transmission flag of the user or the receiver apparatus is changed to an off state, and further to step 431, at which it is alarmed by means of the buzzer or displayed on the display element 22LDa that the user is not selected. Thereafter, the control sequence returns to step 401.

If it is discriminated at step 424 that the bidirectional program information is not (selection+ID request) data, then the control sequence advances to step 432. Referring now to FIG. 20, at step 432, it is discriminated whether or not the bidirectional program information is question data. If the bidirectional program information is question data, then the control sequence advances to step 433, at which it is discriminated whether or not a response completion flag is on. If the response completion flag is not on, then the control sequence advances to step 434, at which a last response history of the response history memory is set to a no-response condition, whereafter the control sequence advances to step 435. When the response completion flag is an on state, the control sequence directly advances from step 433 to step 435.

At step 435, the question data are stored. Then, the control sequence advances to step 436, at which the response completion flag is set, and further to step 437, at which measurement of a response allowed time is started. Thereafter, the control sequence returns to step 401.

When it is discriminated at step 432 that the bidirectional program information is not question data, the control sequence advances to step 438, at which it is discriminated whether or not the bidirectional program information is call origination restriction cancellation information. Then, if the bidirectional program information is call origination restriction cancellation information, then the control sequence advances to step 439, at which the call origination restriction of the receiver apparatus is canceled, whereafter the control sequence returns to step 401. If the bidirectional program information is not call origination restriction cancellation information at step 438, then the control sequence directly returns to step 401.

Subsequently, the processing illustrated in FIGS. 21 and 22 which is performed when DTMF tones are not detected by the DTMF receiver 217 at step 401 but it is discriminated at step 405 that a remote control signal is received will be described.

Referring first to FIG. 21, it is discriminated at step 441 whether or not the received remote control signal is a signal of a responding operation, that is, a signal of a number of an answer choice. If the received remote control signal does not represent a responding operation, then the control sequence advances to step 442, at which processing other than responding operation processing is performed, whereafter the control sequence returns to step 401.

If it is discriminated at step 441 that the received remote control signal represents a responding operation, the control sequence advances to step 443, at which it is discriminated whether or not question data have been received. If question data have not been received, then the control sequence advances to step 444, at which it is notified to the user, for example, by means of the buzzer that the operation is in error. Thereafter, the control sequence returns to step 401.

If it is discriminated at step 443 that question data have been received, then the control sequence advances to step 445, at which it is discriminated whether or not a response to the question has completed already. If the response to the question has completed, the control sequence advances to step 446, at which it is notified to the user, for example, by means of the buzzer, that the operation is in error. In short, in the present example, only a first response is determined effective. Thereafter, the control sequence returns to step 401.

If it is discriminated at step 445 that a response to the question has not completed yet, then the control sequence advances to step 447, at which it is discriminated that the response has been performed within the allowed time range. If the response has been performed after the allowed time range, the control sequence advances to step 448, at which it is notified to the user, for example, by means of the buzzer, that the operation is in error. Further, the ID transmission flag is changed to an off state. Thereafter, the control sequence returns to step 401.

If it is discriminated at step 447 that the response has been performed within the allowed time range, then the control sequence advances to step 449, at which it is discriminated whether or not the receiver apparatus is in a call origination restriction condition. If the receiver apparatus is in a call origination restriction condition, then the control sequence advances to step 450, at which it is notified to the user, for example, by means of the buzzer that the operation is in error. Thereafter, the control sequence returns to step 401.

If it is discriminated at step 449 that the receiver apparatus is not in a call origination restriction condition, then the control sequence advances to step 451. Referring now to FIG. 22, at step 451, the response history is stored into the memory. Thereafter, the control sequence advances to step 452, at which automatic dialing is performed to a responding destination telephone number corresponding to the number of the selected answer choice. Then, the control sequence advances to step 453, at which it is discriminated whether or not the ID transmission flag is in an on state.

If it is discriminated at step 453 that the ID transmission flag is in an on state, then the control sequence advances to step 454, at which termination of the call to the other party is confirmed and the ID of the receiver apparatus or the user ID which is designated additional information is transmitted, whereafter the receiver apparatus is put into an on-hook (line releasing) condition. As the designated additional information, all of the response history regarding a series of a plurality of questions may be transmitted alternatively. In this alternative case, the broadcasting station can readily grasp how the responding person has responded to the series of the plurality of questions. It is to be noted that, when the control sequence advances to step 454, the telephone line is in the cut-through condition as described above, and the broadcasting side and the receiver apparatus side are directly connected to each other by way of the telephone line. Thereafter, the control sequence advances to step 456.

On the other hand, if it is discriminated at step 453 that the ID transmission flag is in an off state, then the control sequence advances to step 455, at which termination of the originating call for a response is confirmed and then the receiver apparatus is put into an on-hook condition. Thereafter, the control sequence advances to step 456.

Then at step 456, the response completion flag is changed to an on state, thereby completing the response. Thereafter, the control sequence returns to step 401.

In such a manner as described above, when a response to a bidirectional program is performed using a telephone voting service, related responses to a plurality of questions can be anticipated. Then, since origination of a call is restricted on the responding side, wasteful origination of a call for a response can be prevented, and a wasteful burden of a telephone charge is not assigned to a user.

Particularly, in the existing telephone voting service, the time for acceptance of votes is limited to approximately 5 minutes, and votes after the time elapses are invalid. However, since a large number of subscriber exchanges must be controlled by a data base center, even after the time limit within which acceptance of a vote should be allowed passes, some subscriber exchange may possibly accept terminating calls. However, in the embodiment described above, since origination of a call is restricted with each of receiver apparatus of responding persons within a response allowing time range included in question data, a responding person can be prevented from invalid voting.

Further, in the example described above, since the distinction among question data, evaluation data and selection data is defined as an identifier at the top of the structure of a data packet, the kind of the packet can be discriminated readily.

Further, based on check data at a last portion of the packet, a malfunction of the receiver/responding apparatus caused by a mere error in reception or by reception from midway by switching between channels during broadcasting of a data packet can be discriminated and prevented by the receiver/responding apparatus.

Further, in the example described above, since, in a cut-through condition, also information of a response history of the receiver apparatus can be sent to the broadcasting station side, the broadcasting station side can broadcast a bidirectional broadcast which utilizes the information of the response history effectively.

In the example described above, bidirectional program information is multiplexed with a broadcasting audio signal using a DTMF signal. A receiver for a DTMF signal is spread widely for a telephone set, and an adapter apparatus of a receiver apparatus can be manufactured at a low cost. Then, since bidirectional program information is in the form of a DTMF signal, it is collected by means of a microphone of the adapter apparatus and decoded by means of a built-in DTMF receiver. Therefore, in a system on the receiver side, a television receiver need not be modified at all.

However, the adapter need not necessarily have such a construction as described above, and the receiving/decoding section for a DTMF signal may be built in a television receiver while also an NCU section is built in the television receiver. In this instance, the remote commander for a responding operation and the remote commander for the television receiver may be constructed as a single common remote commander.

It is to be noted that broadcasting of question data, evaluation data, selection data and (selection+ID request) data need not be performed in this order, and they may otherwise be broadcast at a time. In this instance, on the receiver apparatus side, those data transmitted simultaneously are stored once into a memory and then read out suitably to perform processing for evaluation or selection. In this instance, the timing of the evaluation or the timing of the selection may be instructed by multiplexed data from the broadcasting station side.

[Other Embodiments]

Program related information of a bidirectional program may be superposed with an empty horizontal section within a vertical blanking period of a video signal. Further, also a multiplexed broadcast wherein data are multiplexed as a sub audio signal for a sound multiplexed signal or a signal of a different band from that of a video signal or an audio signal as a principal broadcasting signal is used to transmit multiplexed data can be performed by modifying the sections for extracting and decoding processing of multiplexed data.

Further, the present invention can be applied also to satellite broadcasting or cable television broadcasting. Further, if such information as question data, evaluation data or selection data as described above is constructed using, for example, a DTMF signal in a comparatively narrow audio band as in the example described above and is broadcast in a multiplexed condition with a main broadcasting audio signal, then the present invention can be applied also to a receiver which can receive an AM or FM radio broadcast or a PCM audio broadcast.

Further, a broadcast called "FM multi-teletext broadcast" has been realized wherein data such as character information are transmitted in a multiplexed condition by way of an FM radio broadcasting wave together with a program of an original audio broadcast, and also an FM receiver which receives such FM teletext broadcast and can display character information and so forth on a display element such as an LCD (liquid crystal display element) has been put on the market. Thus, information of question data, selection data, evaluation data and so forth described above can be broadcast in a multiplexed condition by the FM teletext broadcast.

In particular, the FM teletext broadcast allows mobile reception by an automobile or the like and is called DARC system. The specifications of multiplexing of digital data such as character information are: the subcarrier frequency is 76 kHz; the transfer rate is 16 kbits/sec; the modulation method is the LMSK; and the error correction method is a product code by a (272, 190) abbreviated difference set cyclic redundancy check.

Further, the program service of character information and so forth includes different levels 1, 2 and 3. While any of those levels presents (displays) character information and so forth by representation of dots, the level 1 is a service directed to a receiver which can display 15.5 characters×2.5 lines including a header portion, and information thereof is characters. Meanwhile, the level 2 is a service directed to a receiver which can display 15.5 characters×8.5 lines including a header portion, and information thereof is characters and graphic figures. Further, the level 3 is a service of traffic information directed to a receiver which can display a detailed map from a CD-ROM (compact disk read only memory), that is, to a navigation system.

Further, program services of the level 1 may be news, weather forecast, traffic information, entertainment and main complementary programs. In this instance, the entertainment provides fortunetelling, a listener message board, a quiz, town information and so forth.

Meanwhile, the main complementary programs provide, for example, when the original audio broadcasting program is a music program, complementary information of the program such as the titles of tunes, the names of players, and a telephone number or a facsimile number for acceptance of requests. It is to be noted that a main complementary program will be hereinafter referred to as "program information".

Further, as a program service other than those described above, "emergency information" may be applicable which is provided when it is required in emergency.

FIG. 23 is a construction of a frame of an LMSK signal which is multiplexed in an FM teletext broadcast described above. One frame of the LMSK signal is formed from 272 blocks, and each block includes 288 bits.

Meanwhile, one frame is divided into a block of 190 data packets and another block of 82 vertical parity packets. The block of vertical parity packets is sent out in a dispersed condition.

A BIC (block identification code) of 16 bits is added to the top of each block. Four different codes are used for the BIC so that different parity packets are distinguished from each other and the top of each frame is identified using the BIC.

Meanwhile, the block of data packets includes a data packet of 176 bits subsequently to the BIC, followed by a CRC code of 14 bits and further includes a horizontal parity check code of 82 bits subsequently to the CRC code.

In this instance, the CRC code is added in order to detect a remaining error after error correction based on a product code. Further, the block of vertical parity packets includes a vertical parity packet of 272 bits.

Figure 24:
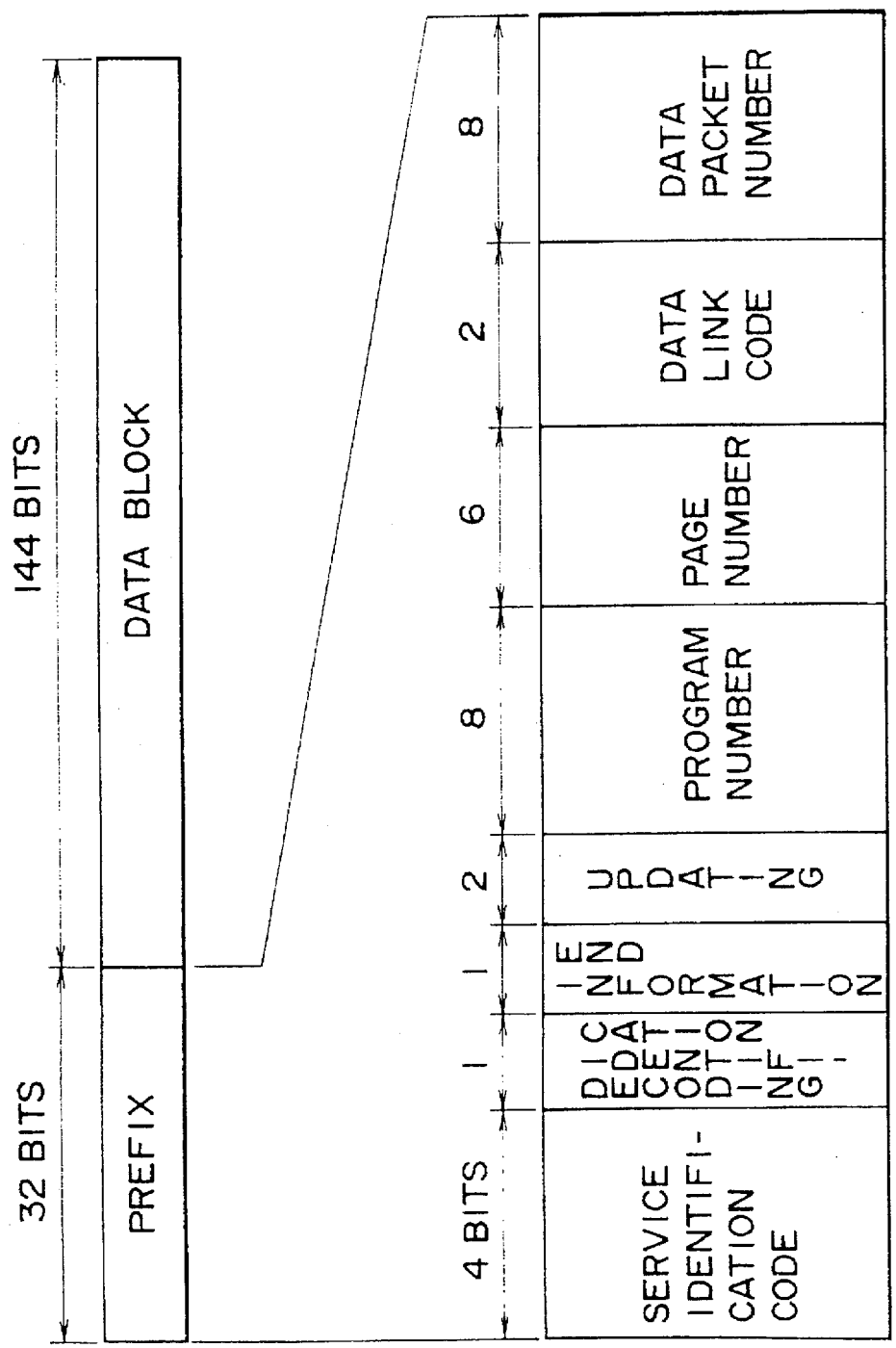

Further, each data packet is formed from, as shown at an upper portion of FIG. 24, a prefix of 32 bits and a following data block of 144 bits.

The prefix is formed from, as shown at a lower portion of FIG. 24, a service identification code, a decoding identification flag, an information end flag, an updating flag, a program number, a page number, a data link code and a data packet number.

The service identification code is formed from 4 bits and is used to identify contents of a program or the like. For the level 1, "1" represents general information for sequential reception processing; "2" represents general information for recording reception processing; and "4" represents traffic information.

In this instance, the sequential reception processing signifies a mode in which presentation decoding processing is started immediately after a first data packet of program data or page data arrives at a receiver. The recording reception processing signifies another mode in which all of program data or page data are received and recorded first and, only after error correction processing by a CRC code for each data group is performed, presentation decoding processing is started.

The sequential reception processing is used for a program wherein presentation timings on the receiver side must be determined on the transmitter side or wherein presentation is not performed in time if decoding processing is started after the last packet of a data group is acquired.

Meanwhile, the decoding identification flag is formed from 1 bit and exhibits "1" when an error correction circuit of the receiver outputs data by decoding only in a horizontal direction, but exhibits "0" when data are outputted after decoding in both of a horizontal direction and a vertical direction.

When the sequential reception processing is designated and the decoding identification flag is "0", it is prescribed that the receiver performs, after the BIC at the top of each data packet is received, decoding processing for presentation of the data packet at the point of time of the BIC at the top of a data packet after 302 packets from the data packet.

Further, the information end flag is formed from 1 bit and exhibits "1" when a data group to be sent out with a certain data group number is ended, but exhibits "0" in any other case. Further, the updating flag is formed from 2 bits and is incremented by one each time a data group is updated. Meanwhile, the program number is formed from 8 bits while the page number is formed from 6 bits, and a data group number is formed from the program number and the page number.

Further, the program number ranges from 0 to 255, and "0" is allocated to a "general table of contents"; "254" is allocated to the main complementary program (program information); and "255" is allocated to the emergency information.

Meanwhile, the page number ranges from 1 to 62. In other words, one program includes 62 pages in the maximum. Then, one page corresponds to a plurality of data groups, and one data group is formed from one or a plurality of data blocks.

Further, the link code is formed from 2 bits, and when data which should belong to one data group is divided into four data groups in the maximum because the data have such a large capacity that the number of packets exceeds the maximum value of the data packet number and such divided data groups are transmitted with a same data group number but with different data link codes, the link code is used to link the data groups in order of 0→1→2→3.

Meanwhile, the data packet number is formed from 8 bits and applied in order beginning with "0" such that it represents an order number of a data packet in one program. In other words, the packet number represents the order of the data packet in one program.

Then, in the level 1, one page is displayed generally in a displaying form of 15.5 characters×2.5 lines, but may otherwise be displayed in another displaying form of 15.5 characters×8.5 lines. In this instance, the character data designate characters represented by JIS codes and alphanumeric characters, "hiragana", "katakana" and so forth.

For the level 1, a receiver can be used wherein, for example, an LCD (liquid crystal display device) has a display screen which can display 15.5 characters×2.5 lines as described above.

Then, the receiver receives an LMSK signal together with a stereo composite signal, decodes such character data as described above from the LMSK signal and writes the decoded character data into a buffer memory.

Further, a "general table of contents" key is provided on the receiver or a remote control transmitter for remotely controlling the receiver. When the key is manually operated, the receiver presents a general table of contents (main menu) on a display screen thereof.

Meanwhile, the receiver or the remote control transmitter is provided with a "page (screen) feeding" key. When the key is manually operated, a next page or next lines of a page in the displaying form of 8.5 lines are displayed on the display screen.

Then, if the user selectively determines a number of an item to be observed from within the general table of contents, then a table of contents of the thus selectively determined item is presented. For example, if the user selects the "weather forecast" from the general table of contents, then another table of contents including "today's weather", "tomorrow's weather" and so forth is presented.

Further, if the user selectively determines a number of an item to be observed from the table of contents, then the first page of the thus determined item is presented. For example, if the user selects the "today's weather" from within the table of contents, then detailed character information of the "today's weather" is presented.

In another embodiment described below, question data, evaluation data, selection data and (selection and ID request) data described hereinabove are broadcast in a multiplexed condition in synchronism with an FM radio broadcast making use of the program service of the level 1 of the FM teletext broadcast.

Figure 25:
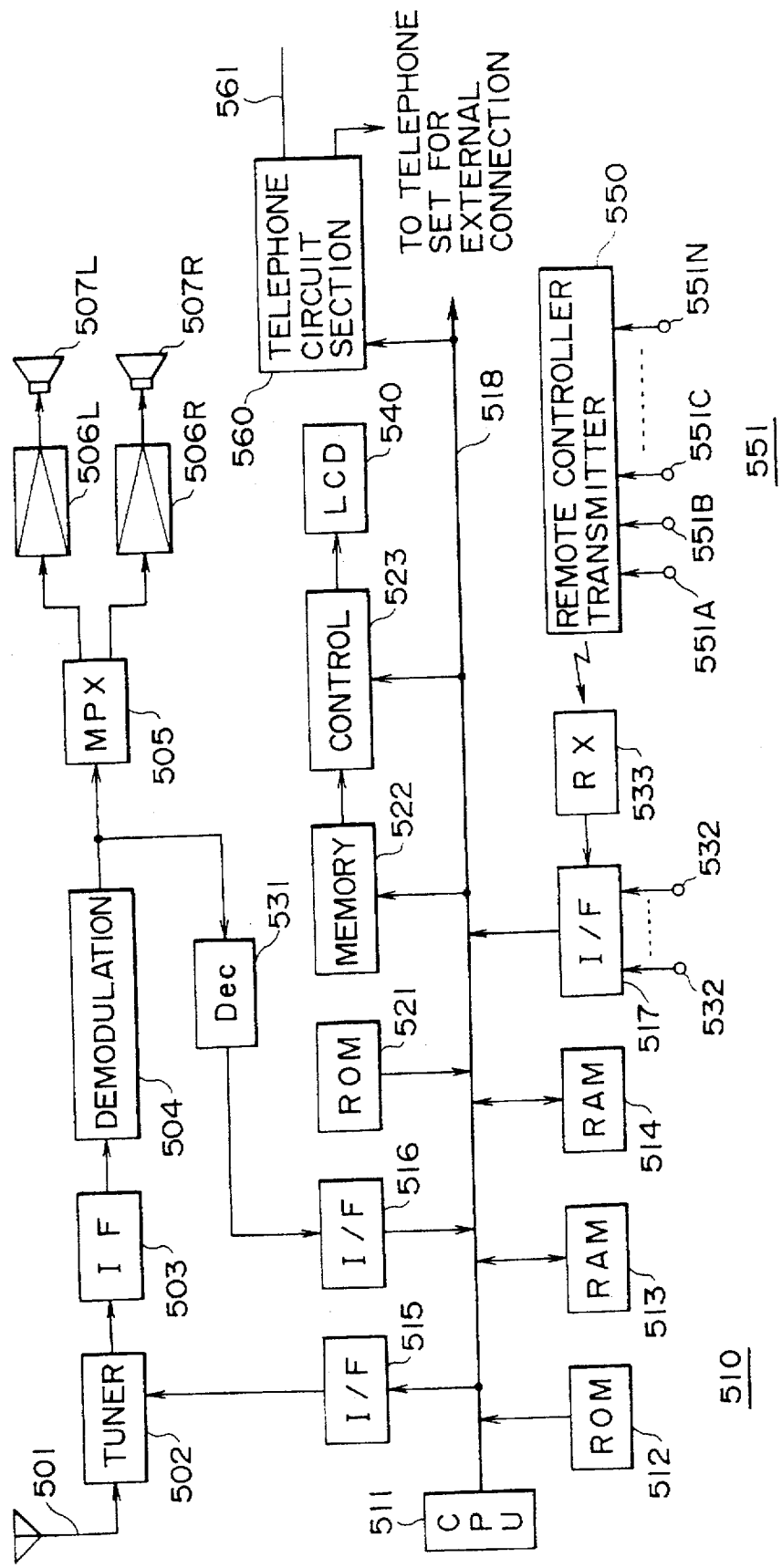
FIG. 25 is a block diagram showing a form of a receiver apparatus for a bidirectional broadcast according to the present invention, wherein the receiver apparatus is of a type capable of receiving an FM teletext broadcast.
Figure 26:
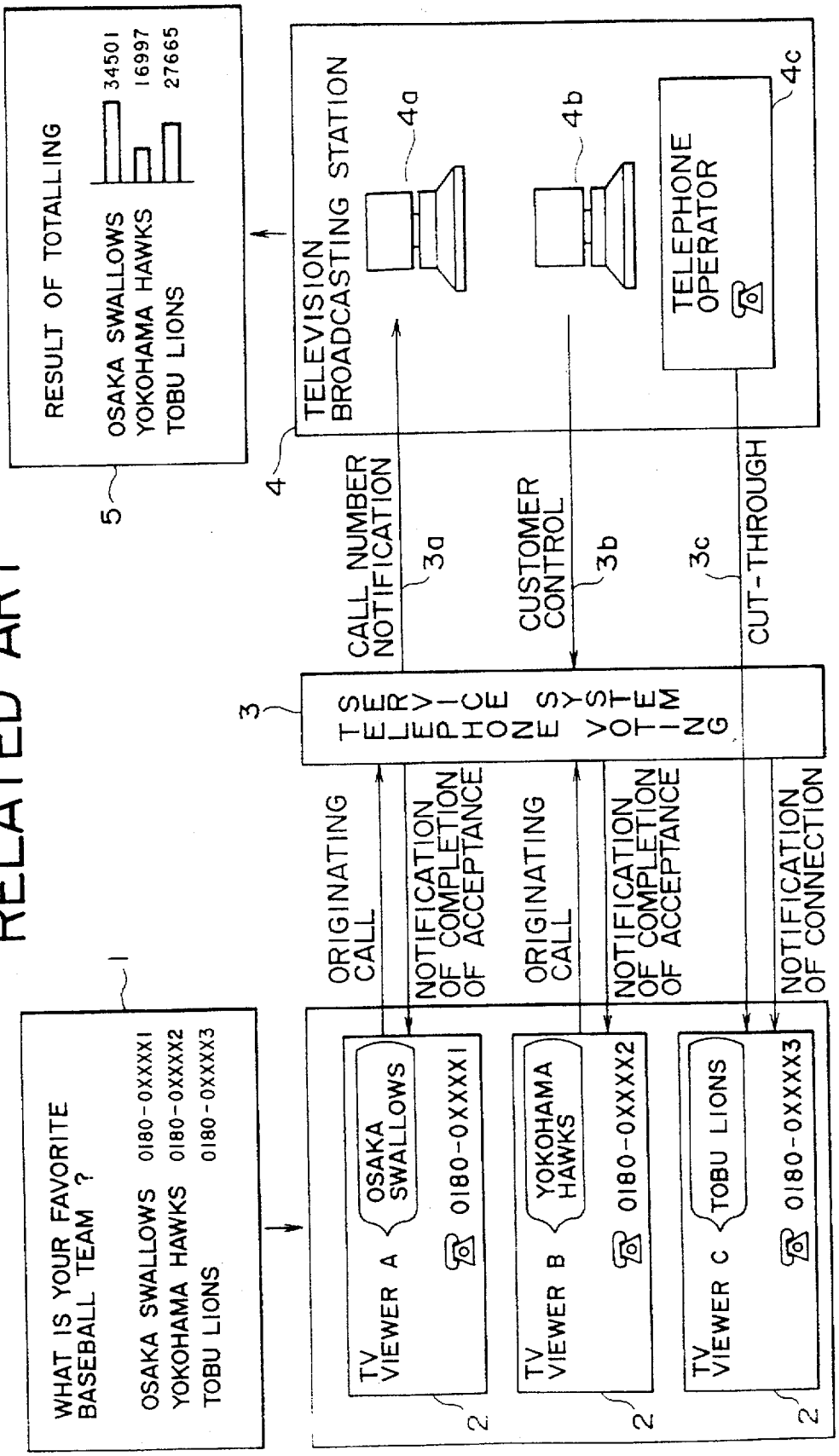
FIG. 26 is a diagrammatic view illustrating a telephone voting service.

FIG. 25 shows a construction of a receiver apparatus of the form described above. The receiver apparatus is constructed as a signal system which is applied to an FM receiver carried on a vehicle. The FM receiver has a reception capacity of the level 1 for an FM teletext broadcast.

Referring to FIG. 25, FM signals received by an antenna 501 are supplied to a tuner circuit 502 of the synthesizer type, by which a broadcasting station of an object frequency is selected and the FM signal of it is converted into an intermediate frequency signal. The intermediate frequency signal is supplied to an FM demodulation circuit 504 by way of an intermediate frequency amplifier 503.

Thus, from the FM demodulation circuit 504, a frequency multiplexed signal of an addition signal (L+R) of audio signals L and R of the stereo left and right channels, a DSB signal balanced-modulated with a difference signal (L−R) of the audio signals L and R, a pilot signal and an LMSK signal of an FM teletext signal described above is extracted.

The frequency multiplexed signal thus extracted is supplied to a stereo demodulation circuit 505, by which the audio signals L and R are demodulated from the addition signal (L+R) and the DSB signal. The thus demodulated signals L and R are supplied to loudspeakers 507L and 507R for the left and right channels by way of amplifiers 506L and 506R, respectively.

Further, the FM receiver includes a microcomputer 510 for controlling selection of a broadcasting station by the tuner circuit 502 and displaying of characters from an FM teletext broadcast.

The microcomputer 510 includes a CPU 511 for executing a program, a ROM 512, a RAM 513 for a working area, and another RAM 514 serving as a reception buffer for data of an FM teletext broadcast. In this instance, the ROM 512 has written therein various routines including a processing routine similar to that described hereinabove with reference to FIGS. 17 to 22 and data for displaying predetermined character trains (texts). In the present embodiment, the processing routine is the same as that illustrated in FIGS. 17 to 22 except that the processes at steps 401 and 402 are changed to a detection processing step for teletext data and a decoding processing step for the teletext data, respectively.

The memories 512 to 514 are connected to the CPU 511 by way of a system bus 518. Interface circuits (ports) 515 to 517 are connected to the system bus 518.

Data for selection of a broadcasting channel are supplied from the interface circuit 515 to the tuner circuit 502, by which selection of a broadcasting channel is performed. Meanwhile, a demodulated signal from the FM demodulation circuit 504 is supplied to a decoder circuit 531, by which it is decoded and data of an FM teletext broadcast are extracted from an LMSK signal. The data thus extracted are written by way of the interface circuit 516 into the RAM 514 so that the data of the RAM 514 are always updated to the latest data.

Further, various manually operated keys 532 formed from push switches of the non-locking type are connected to the interface circuit 517, and key outputs of them are fetched into the microcomputer 510. Thus, when an arbitrary one of the manually operated keys 532 is depressed, the thus depressed key is discriminated by the CPU 511, and processing corresponding to the depressed key is performed.

However, where the FM receiver is of the vehicle carried type, since the operation panel thereof is so narrow that a large number of manually operable keys cannot be arranged thereon, only those keys which are operated very frequently and which are high in importance are provided as the manually operated keys 532. Other manual operations are performed in response to a remote control signal.

Therefore, also a receiver circuit 533 is connected to the interface circuit 517. In the present embodiment, infrared rays are employed for a remote control signal, and the receiver circuit 533 includes a light receiving element for receiving infrared rays from a remote controller transmitter 550, and a decoder circuit for decoding the received remote control signal from the light receiving element.

Also on the remote controller transmitter 550, various manually operable keys 551 (551A to 551N) formed from push switches of the non-locking type are provided. Some of the manually operable keys 551 have the same functions as those of the manually operated keys 532. When an arbitrary one of the manually operable keys 551 is depressed, data corresponding to the thus depressed key are formed and converted into infrared rays, and the infrared rays are transmitted to the FM receiver.

Then, in the FM receiver, the infrared rays transmitted thereto from the remote controller transmitter 550 are received by the receiver circuit 533 to extract the original data. The data are supplied to the interface circuit 517. In this manner, when one of the manually operable keys 551 is depressed, processing corresponding to the depressed key is executed by the microcomputer 510 similarly as when one of the manually operated keys 532 is depressed.

Further, a font ROM (character generator) 521 having font data for converting a character code transmitted thereto by an FM teletext broadcast into display data is connected to the system bus 518. Also a display memory 522 and a display controller 523 are connected to the system bus 518, and for example, an LCD 540 serving as a display element is connected to the display controller 523.

In the present embodiment, the LCD 540 has a display capacity of 15.5 characters×2.5 lines. The display memory 522 stores data of the bit map type corresponding to the dot displaying method of the LCD 540 and has a capacity for one screen. It is to be noted that a character broadcasting program is broadcast with the level 1 and one page of it has a size (capacity) of one screen.

Thus, character codes held in the RAM 514 are read out by the CPU 511, and the thus read out character codes are converted into display data using the font data of the font ROM 521. The display data are written into the display memory 522. Further, in this instance, the display data of the display memory 522 are repetitively read out by the display controller 523, converted into a display signal and supplied to the LCD 540. Accordingly, characters of character codes read out from the RAM 514 by the CPU 511 are displayed on the LCD 540.

A telephone circuit section 560 having a similar construction to that of the adapter apparatus body 22 described hereinabove and having an automatic call originating function with a built-in NCU is further connected to the system bus 518. The telephone circuit section 560 is connected to a telephone line 561, and another telephone set (not shown) for external connection can be connected to the telephone circuit section 560. In the telephone circuit section 560, the microcomputer 510 has the function of the microcomputer 300 in the circuit of FIG. 15 described hereinabove.

When, for example, such a winner-success type bidirectional program as described hereinabove is broadcast as an FM radio broadcasting program, such question data as described hereinabove with reference to FIG. 7 are broadcast as FM teletext data in a multiplexed condition together with a broadcast of a question and answer choices by an announcer. Thereafter or simultaneously, evaluation data, selection data and (selection+ID request) data are broadcast in a multiplexed condition. Those data are stored into the RAM 514 of the FM radio receiver of FIG. 25.

Then, if the listener of the FM radio receiver of FIG. 25 inputs a number of one of the answer choices as an answer to the question by way of, for example, the remote controller transmitter 550, then a call is automatically originated to one of telephone numbers of the telephone voting service which corresponds to the inputted answer choice number by the telephone circuit section 560 using the question data stored in the RAM 514 in such a manner as described hereinabove. A history of the response is successively stored into the RAM 514.

Then, each response or the response history is evaluated based on the evaluation data acquired as multiplexed data, and the listener of the FM radio receiver is selected as a winner or a loser.

Such provision of a question by a broadcasting program and multiplexed broadcasting of question data, evaluation data and so forth as described above are repeated. Finally, selection is performed based on selection+ID request) data, and if the listener of the FM radio receiver is a winner, response information including a user ID is sent to a predetermined response destination. On the other hand, if the listener of the FM radio receiver is a loser, then it is restricted from responding later.

In this manner, by making use of a telephone voting service for responses and broadcasting question data, evaluation data, selection data and so forth from the broadcasting station side making use of an FM teletext broadcast, a bidirectional program wherein related responses to a plurality of questions can be anticipated can be provided.

It is to be noted that, in the present system which makes use of an FM teletext broadcast, if evaluation data or selection data are displayed on the LCD 540, then the user can readily confirm evaluation of a response of the user itself or a result of selection. Besides, since the user can select such display of evaluation data or selection data from a menu display, one of a case wherein the user enjoys the bidirectional broadcast without looking at the answer and another case wherein the user enjoys the bidirectional broadcast while looking at the answer can be selected.

Having now fully described the invention, it will be apparent to one of ordinary skill in the art that many changes and modifications can be made thereto without departing from the spirit and scope of the invention as set forth herein.

What is claimed is:

1. A bidirectional broadcasting method wherein a question, a plurality of answer choices for a response to the question and responding destination telephone numbers for the individual answer choices are broadcast from a broadcast studio along with a broadcast signal and terminating call number information of responses to the individual answer choices from responding persons is obtained by said broadcast studio, the improvement comprising the steps of:

broadcasting said question, said answer choices, said responding telephone numbers, evaluation information and selection information to a receiver apparatus;

operating said receiver apparatus by a responding person, whereby one of said plurality of answer choices is selected;

transmitting said destination telephone number corresponding to said selected answer choice to communicate said selected answer choice to said studio;

comparing a history of previously selected answer choices with the evaluation information to evaluate histories of responses to more than one question; and selecting a response-allowed person on the basis of the comparison and the selection information, whereby the broadcasting of a question, the broadcasting of evaluation information and the broadcasting of selection information are performed repetitively more than one time to successively reduce the number of the response-allowed persons.

2. A bidirectional broadcasting method according to claim 1 wherein the question and the answer choices to the question are broadcast as a broadcasting program to receiving persons, and a number of the question, numbers of the answer choices and the responding destination telephone number information for the individual answer choices are broadcast in a multiplexed condition with said broadcasting signal.

3. A bidirectional broadcasting method according to claim 2 wherein the broadcasting signal is a television signal, and said responding destination telephone number information, said evaluation information and said selection information are multiplexed in a vertical blanking period of the television signal.

4. A bidirectional broadcasting method according to claim 2 wherein the broadcasting signal is a television signal, and said responding destination telephone number information, said evaluation information and said selection information are multiplexed with an audio multiplexed channel.

5. A bidirectional broadcasting method according to claim 2 wherein the broadcasting signal is an FM radio signal, and said responding destination telephone number information, said evaluation information and said selection information are transmitted by an FM multiteletex broadcasting system.

6. A bidirectional broadcasting method according to claim 2 wherein, for multiplexing, said responding destination telephone number information, said evaluation information and said selection information are multiplexed as sound which can be separated from ordinary sound in an audio signal of the broadcasting signal.

7. A bidirectional broadcasting method according to any one of claims 1 to 6 wherein terminating calls to the telephone numbers for the individual answer choices from the responding persons are received by a central office of a telephone voting service and numbers of the terminating calls for the individual answer choices are notified from the central office to the broadcasting studio.

8. A bidirectional broadcasting method according to any one of claims 1 to 6 further comprising the step of, after the number of the response-allowed persons is reduced, broadcasting data for requesting sending out of identification information of the individual response-allowed persons in a multiplexed condition with the broadcasting signal to the receiver apparatus.

9. A bidirectional broadcasting system which includes a broadcasting station which provides a bidirectional program as a broadcasting signal, and a plurality of receiver apparatus which respond to the bidirectional program by way of telephone lines, comprising:

broadcasting means provided in said broadcasting station for broadcasting a plurality of questions, answer choices for responses to the plurality of questions, a plurality of responding destination telephone numbers, each corresponding to one of said answer choices, evaluation information, and selection information;

input means on each receiver apparatus for detecting an answer choice selected by a responding person corresponding to each of said plurality of questions;

telephone calling means for telephone dialing said destination telephone number corresponding to said selected answer choice;

storage means provided on each of the receiver apparatus for storing a history of the selected answer choices;

evaluation means provided on each of the receiver apparatus for evaluating the history based on the evaluation information received from the broadcasting station;

selection means provided on each of the receiver apparatus for determining, based on the selection information and a result of the evaluation, whether a responding person of the receiver apparatus can be allowed to respond to a later question; and means provided on each of the receiver apparatus for preventing origination of a call for a response to a subsequent question from the receiver apparatus when it is determined that the responding person of the receiver apparatus is not a response-allowed person to a later question.

10. A bidirectional broadcasting system according to claim 9 wherein each of the questions and the answer choices to the question are broadcast as a broadcasting program to the receiver apparatus, and identities of the plurality of questions, identities of the answer choices and responding destination telephone number information for the individual answer choices are broadcast as a multiplexed signal.

11. A bidirectional broadcasting system according to claim 9 wherein the broadcasting signal is a television signal, and a vertical blanking period of the television signal is used for carrying said questions, answer choices, telephone number information, evaluation information and selection information.

12. A bidirectional broadcasting system according to claim 9 wherein the broadcasting signal is a television signal, and said questions, answer choices, telephone number information, evaluation information and selection information are carried on an audio multiplexed channel.

13. A bidirectional broadcasting system according to claim 9 employing an FM radio signal, wherein said questions, answer choices, telephone number information, evaluation information and selection information are carried on an FM multiteletex broadcasting system.

14. A bidirectional broadcasting system according to claim 9 wherein, for multiplexing, said questions, answer choices, telephone number information, evaluation information and selection information is multiplexed as sound which can be separated from ordinary sound in an audio signal of the broadcasting signal.

15. A bidirectional broadcasting system according to any one of claims 9 to 14 further comprising a telephone voting system wherein terminating calls to the telephone numbers for the individual answer choices are received by a central office and numbers of the terminating calls are notified from the central office to the broadcasting station.

16. A bidirectional broadcasting system according to any one of claims 9 to 14 wherein the broadcasting station broadcasts a question, evaluation information and selection information repetitively to successively reduce the number of the response-allowed persons, and then broadcasts data for requesting sending out of identification information in a multiplexed condition with the broadcasting signal to the receiver apparatus, and each of the receiver apparatus includes storage means for holding identification information of the receiver apparatus and transmits, when the data for requesting sending out of identification information are detected, the identification information stored in said storage means to a designated responding destination.

17. A receiver apparatus for a bidirectional broadcast, comprising:

a broadcasting program receiving section for receiving a broadcasting signal and providing a bidirectional broadcast program to a user of said receiver apparatus;

a decoding section for extracting and decoding bidirectional program information multiplexed with the broadcasting signal to generate evaluation data and selection data;

a communication interface for responding to the bidirectional program by way of a telephone line;

a key inputting operation section manually operable by the user to perform responding operations to the bidirectional program;

a response execution section for communicating said responses via said communications interface in response to the responding operations;

storage means for storing a history of the responding operations;

evaluation means for comparing the history of responding operations stored in said storage means with evaluation data obtained from said multiplexed signal by said decoding means to perform an evaluation of the response; and discrimination means for comparing said selection data with a result of said evaluation and for controlling said response execution section when said result of said evaluation does not correspond with said selection data, whereby a subsequent response by way of the telephone line is prevented irrespective of a later responding operation of the user.

18. A receiver apparatus for a bidirectional broadcast according to claim 17 further comprising storage means for storing identification information for identification of said receiver apparatus, and wherein, when the multiplexed signal obtained from said decoding section is determined to be data requesting sending out of identification information of a receiver apparatus, the identification information stored in said storage means is transmitted to a designated responding destination.

* * * * *